(12) United States Patent
Child et al.

(10) Patent No.: US 10,873,728 B2
(45) Date of Patent: Dec. 22, 2020

(54) HOME AUTOMATION SYSTEM-INITIATED CALLS

(71) Applicant: Vivint, Inc., Provo, UT (US)

(72) Inventors: Michael D. Child, Lehi, UT (US); Matthew Mahar, South Jordan, UT (US); Matthew J. Eyring, Provo, UT (US); Clint Huson Gordon-Carroll, Orem, UT (US); Jeremy Bruce Warren, Draper, UT (US); James Ellis Nye, Alpine, UT (US); Jefferson Huhta Lyman, Alpine, UT (US); Michelle Zundel, Draper, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 16/539,114

(22) Filed: Aug. 13, 2019

(65) Prior Publication Data

US 2020/0045268 A1 Feb. 6, 2020

Related U.S. Application Data

(63) Continuation of application No. 15/277,661, filed on Sep. 27, 2016, now Pat. No. 10,382,729, which is a
(Continued)

(51) Int. Cl.
*H04N 7/18* (2006.01)
*H04L 12/28* (2006.01)
(Continued)

(52) U.S. Cl.
CPC ......... *H04N 7/183* (2013.01); *H04L 12/2803* (2013.01); *H04L 12/4625* (2013.01);
(Continued)

(58) Field of Classification Search
USPC .......................... 455/414.1; 379/52
See application file for complete search history.

(56) References Cited

U.S. PATENT DOCUMENTS

| 6,021,181 A | 2/2000 | Miner et al. |
| 6,381,323 B1 | 4/2002 | Schwab et al. |
| (Continued) | | |

FOREIGN PATENT DOCUMENTS

| JP | 2012113446 A | 6/2012 |
| WO | 0117247 A1 | 3/2001 |
| WO | 2015023405 A1 | 2/2015 |

OTHER PUBLICATIONS

PCT International Search Report for International Application No. PCT/US2016/067434, dated Apr. 7, 2017 (3 pp.).
(Continued)

*Primary Examiner* — Maria El-Zoobi
(74) *Attorney, Agent, or Firm* — Holland & Hart, LLP

(57) ABSTRACT

Methods, apparatuses, and techniques for security and/or automation systems are described. In one embodiment, the method may include receiving a call initiation instruction at a video monitoring component of a home automation system. The method may further include analyzing the call initiation instruction, and communicating a call request from the video monitoring component of the home automation system to a first remote user based at least in part on the received call initiation instruction.

20 Claims, 10 Drawing Sheets

Related U.S. Application Data continuation-in-part of application No. 14/989,595, filed on Jan. 6, 2016, now Pat. No. 10,271,012.

(51) Int. Cl.
*H04L 12/46* (2006.01)
*H04N 7/14* (2006.01)

(52) U.S. Cl.
CPC ............ *H04L 2012/2841* (2013.01); *H04L 2012/2849* (2013.01); *H04N 7/14* (2013.01)

(56) References Cited

U.S. PATENT DOCUMENTS

| | | |
|---|---|---|
| 7,596,129 B2 | 9/2009 | Bossemeyer, Jr. et al. |
| 7,801,294 B2 | 9/2010 | Levy et al. |
| 7,881,455 B2 | 2/2011 | Wolter et al. |
| 7,912,720 B1 | 3/2011 | Hakkani-Tur |
| 8,351,979 B2 | 1/2013 | Seguin et al. |
| 8,363,791 B2 | 1/2013 | Gupta et al. |
| 8,589,485 B2 | 11/2013 | Uchide |
| 8,705,701 B2 | 4/2014 | Bennett, III et al. |
| 8,825,020 B2 | 9/2014 | Mozer et al. |
| 9,230,560 B2 | 1/2016 | Ehsani et al. |
| 9,247,428 B2 | 1/2016 | Sankaranarayanan et al. |
| 9,711,036 B2 | 7/2017 | Fadell et al. |
| 2003/0012344 A1 | 1/2003 | Agarwal et al. |
| 2003/0013503 A1 | 1/2003 | Menard et al. |
| 2006/0072552 A1 | 4/2006 | Shnitzer et al. |
| 2006/0184800 A1 | 8/2006 | Rosenberg |
| 2007/0103548 A1* | 5/2007 | Carter ............... H04N 7/148 348/143 |
| 2007/0189267 A1 | 8/2007 | Metcalf et al. |
| 2008/0136908 A1 | 6/2008 | Carter |
| 2008/0288665 A1 | 11/2008 | Williams |
| 2008/0304470 A1 | 12/2008 | Ganganna |
| 2009/0079813 A1* | 3/2009 | Hildreth ............... G06F 3/017 348/14.03 |
| 2009/0217210 A1* | 8/2009 | Zheng ............ H04N 21/44008 715/863 |
| 2010/0136980 A1 | 6/2010 | Linguist et al. |
| 2010/0279664 A1 | 11/2010 | Chalk |
| 2011/0141951 A1 | 6/2011 | Ramachandran et al. |
| 2012/0128143 A1 | 5/2012 | Rudman |
| 2012/0257615 A1 | 10/2012 | Eskildsen et al. |
| 2014/0005941 A1 | 1/2014 | Paek et al. |
| 2014/0108019 A1 | 4/2014 | Ehsani et al. |
| 2014/0171059 A1 | 6/2014 | Parker |
| 2014/0274200 A1 | 9/2014 | Olson |
| 2015/0169213 A1 | 6/2015 | Choi |
| 2015/0229773 A1 | 8/2015 | Miwa |
| 2015/0294542 A1 | 10/2015 | Wada et al. |
| 2016/0065734 A1 | 3/2016 | Bin et al. |
| 2016/0071399 A1 | 3/2016 | Altman et al. |
| 2017/0180964 A1 | 6/2017 | Mehta et al. |
| 2018/0152817 A1 | 5/2018 | Cohen |

OTHER PUBLICATIONS

Shen et al., "TV-Based Caring Videophone System for the Elderly in the Smart Home Environment," Journal of Electrical and Computer Engineering, Jan. 1, 2013.

* cited by examiner

HOME AUTOMATION SYSTEM-INITIATED CALLS

CROSS-REFERENCE TO RELATED APPLICATIONS

The present application is a continuation of U.S. patent application Ser. No. 15/277,661, titled: "HOME AUTOMATION SYSTEM-INITIATED CALLS," filed Sep. 27, 2016, which is a continuation-in-part of U.S. patent application Ser. No. 14/989,595, titled: "HOME AUTOMATION SYSTEM-INITIATED CALLS," filed on Jan. 6, 2016. The disclosures of each of which are incorporated by reference herein in their entirety.

BACKGROUND

The present disclosure, for example, relates to security and/or automation systems, and more particularly to automatically initiating call between a home automation system and a remote user based at least in part on a call initiation instruction received at a video monitoring component of the home automation system.

Security and automation systems are widely deployed to provide various types of communication and functional features such as monitoring, communication, notification, and/or others. These systems may be capable of supporting communication with a user through a communication connection or a system management action.

Home intercom systems may provide for communication between users within the home, but may be closed systems, not allowing for communication with users located outside the home. Other systems may merely allow for remote users to call into the home. There is lacking a smart home communication system with which a call may be placed from the system to remote users outside the home.

SUMMARY

Existing communication means rely primarily on cellular phones and personal computing devices to place calls between remote users. In some instances, however, children without cellular phones, or other users without immediate access to their phones, may wish to place a call to a user outside the home. Particularly where home landline phones are becoming obsolete, a way by which calls may be easily placed to a user outside the home may be desirable. The present disclosure provides systems, methods, and techniques by which such calls may be placed using one or more security and/or automation system components, such as a video and/or an audio monitoring component. In some examples, a user may initiate an instruction and one or more system elements may analyze the initiation instruction and communicate a call (audio and/or video) to a first remote user.

For example, a method for security and/or automation systems is disclosed. In some examples, the method may include receiving a call initiation instruction at a video monitoring component of a home automation system, and analyzing the call initiation instruction. The method may further include communicating a call request from the video monitoring component of the home automation system to a first remote user based at least in part on the received call initiation instruction. In some examples, a call acceptance may be received from the first remote user, and a two-way call may be initiated between the video monitoring component of the home automation system and the first remote user. The two-way call may include any of a two-way audio call, or a one-way video call, or a two-way video call, or a combination thereof. In other examples, the first remote user may reject the incoming call request, and the calling user may be given the opportunity to record a message for the first remote user at the home automation system, for example in the form of an audio, video, and/or text message. The recorded message may be communicated to the first remote user, for example at his smartphone or personal computing device, on a dedicated application. In some examples, a response message from the first remote user may be received at the home automation system based at least in part on the received call rejection or the communicated recorded message.

In some examples, a user may initiate a call with a first remote user by inputting a call initiation instruction at a video monitoring component of the home automation system. For example, a child who is home alone may input a call initiation instruction at a control panel in the home by pressing an appropriate button on the screen or panel associated with the instruction to "Call dad." In other examples, the call initiation instruction may take the form of a verbal command. For example, a user may speak aloud "Call dad," and this command may be detected by a microphone associated with the home automation system, at a sensor, a stand-alone device, and/or a control panel, among other system components. Other embodiments may allow for detection of a gestural command, such as a wave or hand signal performed by the user, detected by a video or motion detection component of the home automation system.

Upon receiving the call initiation instruction, the home automation system may initiate a call with the indicated remote user. For example, the home automation system may initiate an audio and/or video call, via Wi-Fi or another appropriate means, with the remote user's smartphone or personal computing device. In some examples, the remote user may receive a call request at his smartphone or personal computing device, for example through a dedicated application. The remote user may then approve or deny the call request. Where the remote user approves the call request, a two-way voice and/or video call may be established between the home automation system and the remote user. Alternatively, where the remote user denies the call request, the calling user may be given the option to leave a message for the remote user, for example in the form of an audio, video, and/or text message. This message may be recorded at the home automation system, and may be communicated to the remote user. The remote user may then view and/or listen to the message at his convenience on his smartphone and/or personal computing device. The remote user may also reply to the received message, for example by recording an audio, video, and/or text message to be communicated back to the home automation system, where the calling user may view and/or listen to the message. In some examples, a component of the home automation system, such as a control panel, may broadcast the recorded message, for example by playing a recorded audio message over a speaker system and/or projecting a text message on a display screen and/or other surface in the home.

In any example, the voice and/or audio call may be facilitated by an existing component of the home automation system. For example, a user may initiate a call at a control panel in the home, or at a video monitor associated with the home security system. An existing home security camera, for example, may include a speaker and a microphone, and may include a button or other input means for initiating a call to a remote user. In other examples, a dedicated calling component may be associated with the home automation system. In still other examples, a user may utilize his smartphone or personal computing device, for example using a dedicated application, to place a call routed through the home automation system. This embodiment may be useful where, for example, the user does not have cellular service or a Wi-Fi signal on his device, but his device is nonetheless tied, for example via Bluetooth or another known means, to the home automation system.

In some examples, a call initiation instruction received at the home automation system may initiate a call with all remote users associated with the home automation system. For example, a user may provide a general input, such as pushing a button or speaking "[[System Name]], call," and a general call may be placed to any member of the family or other remote user associated with the home automation system. In other examples, a more specific call may be placed to an identified remote user. In still other examples, emergency calls may be initiated upon detection by the home automation system of various emergency parameters. For example, detection by the home automation system of a user shouting "Help!", alone or in combination with other security and/or automation system data, or some other audio trigger may initiate a call with an emergency call center. In other examples, various detected parameters, such as user physiological states, including heart rate, respiration rate, and the like, above or below predetermined physiological thresholds, may trigger a call to an emergency call center.

In some examples, the first remote user may reject the incoming call initiation request. In some examples, a call request may then be communicated to a second remote user based at least in part on the call rejection. For example, a child home alone may first attempt to call his dad; if his dad doesn't answer, the same and/or a different call may then be relayed to his mother. In other examples, the call request may be communicated to at least a second remote user, wherein communicating the call request to the first remote user may overlap with communicating the call request to at least the second remote user. For example, a call request may be initiated to a plurality of remote users successively or simultaneously, such as to all members of a family associated with the home automation system.

In some examples, the method described may further include communicating a second call request to a second remote user based at least in part on communicating the call request to the first remote user. In some examples, the method may include identifying a portion of the call initiation instruction, and communicating the call request to a second remote user based at least in part on the identifying. The identified portion of the call initiation instruction may include any of a key word, or a key phrase, or a combination thereof. For example, where the child home alone attempts to call his dad by speaking a command at a control panel to "Call dad," or "Contact Paul," the system may identify the key word "dad," or "Paul" and infer that the child is attempting to contact a parent and/or a specific person. On the basis of this inference, the system may communicate a call request to the child's mom, on the basis that his mom is also a parent or another user that may be related to Paul by some association. In other examples, the identified portion of the call initiation instruction may include any of an image, or a video segment, or a combination thereof. For example, a child may make a gestural command, detected by a video monitoring component of the home automation system, which indicates that the system should "Call dad." The system may identify this gesture as indicating a desire to reach a parent, and may communicate a call request to the child's mom, simultaneously or serially, based on this identifying.

A method of wireless communication is described. The method may include receiving a tactile input at a camera of a home automation system, identifying a characteristic associated with the tactile input, and establishing a wireless communication link between the camera and a remote device based at least in part on the characteristic associated with the tactile input.

Another apparatus for wireless communication is described. The apparatus may include a processor, memory in electronic communication with the processor, and instructions stored in the memory. The instructions may be operable to cause the processor to receive a tactile input at a camera of a home automation system, identify a characteristic associated with the tactile input, and establish a wireless communication link between the camera and a remote device based at least in part on the characteristic associated with the tactile input.

A non-transitory computer readable medium for wireless communication is described. The non-transitory computer-readable medium may include instructions operable to cause a processor to receive a tactile input at a camera of a home automation system, identify a characteristic associated with the tactile input, and establish a wireless communication link between the camera and a remote device based at least in part on the characteristic associated with the tactile input.

Some examples of the method, apparatus, or non-transitory computer-readable medium described above may further include processes, features, means, or instructions for identifying a predetermined contact associated with the remote device based at least in part on the identified characteristic.

In some examples of the method, apparatus, or non-transitory computer-readable medium described above, the predetermined contact may be an emergency contact.

Some examples of the method, apparatus, or non-transitory computer-readable medium described above may further include processes, features, means, or instructions for transmitting a notification to an application of the remote device indicating an intent to initiate a two-way communication between the camera and the remote device. In some examples of the method, apparatus, or non-transitory computer-readable medium described above, receiving a response from the remote device based at least in part on the notification, wherein establishing wireless communication link further comprises: initiating a two-way communication between the camera and the remote device based at least in part on the response.

In some examples of the method, apparatus, or non-transitory computer-readable medium described above, the initiated two-way communication comprises any of a two-way audio call, or a one-way video call, or a two-way video call, or a combination thereof.

In some examples of the method, apparatus, or non-transitory computer-readable medium described above, the characteristic comprises any of a duration of the received tactile input, or a number of times the tactile input may be received, or a combination thereof.

In some examples of the method, apparatus, or non-transitory computer-readable medium described above, identifying the characteristic comprises: comparing the characteristic with a predetermined tactile input sequence during a period.

In some examples of the method, apparatus, or non-transitory computer-readable medium described above, identifying the characteristic comprises: comparing the tactile input with any of a user-defined input sequence, an input sequence associated with a user profile, a system-defined input sequence, or a combination thereof.

In some examples of the method, apparatus, or non-transitory computer-readable medium described above, the camera comprises: memory that stores a group of predetermined contacts.

Some examples of the method, apparatus, or non-transitory computer-readable medium described above may further include processes, features, means, or instructions for receiving a gesture performed by a user. Some examples of the method, apparatus, or non-transitory computer-readable medium described above may further include processes, features, means, or instructions for identifying the gesture performed by the user by comparing the received gesture with a predefined gesture stored in memory of the camera or a component of the home automation system in communication with the camera. Some examples of the method, apparatus, or non-transitory computer-readable medium described above may further include processes, features, means, or instructions for determining an identity associated with the user, wherein the establishing the wireless communication link may be based at least in part on the determined identity.

Some examples of the method, apparatus, or non-transitory computer-readable medium described above may further include processes, features, means, or instructions for determining a predetermined contact associated with the gesture and the identity of the user. Some examples of the method, apparatus, or non-transitory computer-readable medium described above may further include processes, features, means, or instructions for initiating a two-way call between a remote device of the predetermined contact and the camera.

Some examples of the method, apparatus, or non-transitory computer-readable medium described above may further include processes, features, means, or instructions for receiving audio input, or video input, or some combination. Some examples of the method, apparatus, or non-transitory computer-readable medium described above may further include processes, features, means, or instructions for comparing the received audio input, video input, or some combination with stored profile information, wherein the wireless communication link may be established based at least in part on the comparison and the identified characteristic.

In some examples of the method, apparatus, or non-transitory computer-readable medium described above, the wireless communication link may be established based at least in part on image data or video data captured by the camera. In some examples of the method, apparatus, or non-transitory computer-readable medium described above, the wireless communication link between the camera and the remote device may be established based at least in part on a single actuation of a single button.

In some examples of the method, apparatus, or non-transitory computer-readable medium described above, establishing the wireless communication link further comprises: establishing the wireless communication link between the camera and the remote device and a second remote device based at least in part on the tactile input.

In some examples of the method, apparatus, or non-transitory computer-readable medium described above, the camera may be operable independent of a display component.

Some examples of the method, apparatus, or non-transitory computer-readable medium described above may further include processes, features, means, or instructions for receiving a request to establish a wireless communication link with a camera associated with an entrance to a structure. Some examples of the method, apparatus, or non-transitory computer-readable medium described above may further include processes, features, means, or instructions for establishing a wireless communication link between the camera associated with the entrance to the structure based at least in part on the request The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

The systems and methods described herein relate to facilitating calls between home occupants and remote users. More specifically, the systems and methods provided herein provide techniques to initiate two-way calls from a video monitoring component of a home automation system to one or more remote users.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
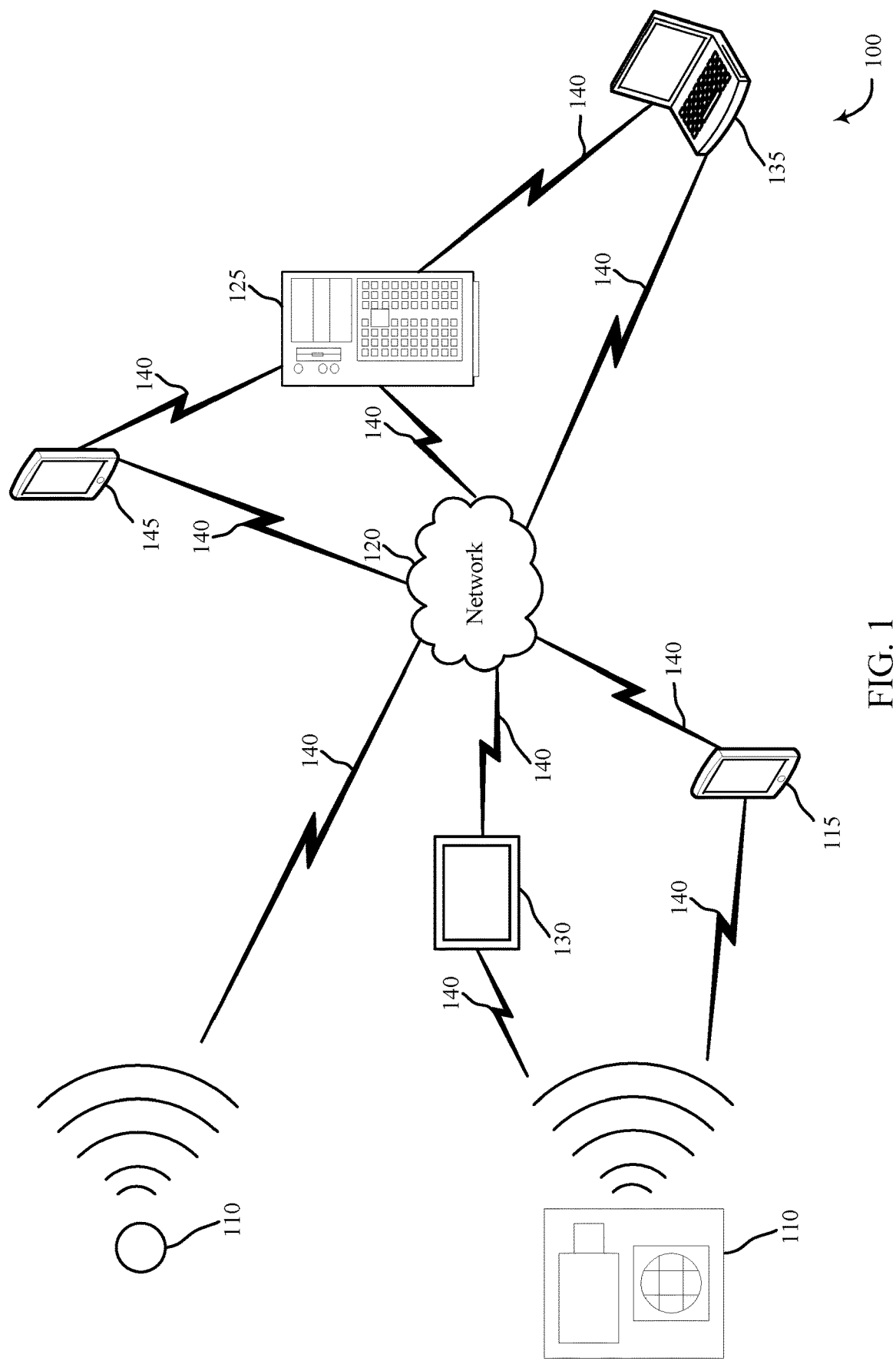
FIG. 1 is a block diagram of examples of security and/or automation systems, in accordance with various aspects of this disclosure.

FIG. 1 is an example of a home automation system 100 in accordance with various aspects of the disclosure. In some embodiments, the home automation system 100 may include one or more sensor units 110, local computing device 115, network 120, server 125, control panel 130, and/or remote computing device 135, 145. The network 120 may provide user authentication, encryption, access authorization, tracking, Internet Protocol (IP) connectivity, and other access, calculation, modification, and/or functions. The control panel 130 may interface with the network 120 through wired and/or wireless communication links 140 and may perform communication configuration, adjustment, and/or scheduling for communication with local computing device 115 or remote computing device 135, 145, or may operate under the control of a controller. Control panel 130 may communicate with a back end server 125—directly and/or indirectly—using one or more communication links 140.

The control panel 130 may wirelessly communicate via communication links 140 with the local computing device 115 via one or more antennas. The control panel 130 may provide communication coverage for a geographic coverage area. In some examples, control panel 130 may be referred to as a control device, a base transceiver station, a radio base station, an access point, a radio transceiver, a home automation control panel, a smart home panel, a security control panel, or some other suitable terminology. The geographic coverage area for control panel 130 may be divided into sectors making up only a portion of the coverage area. Therefore, home automation system 100 may comprise more than one control panel 130, where each control panel 130 may provide geographic coverage for a sector of the coverage area. The home automation system 100 may include one or more control panels 130 of different types. The control panel 130 may be related to one or more discrete structures (e.g., a home, a business) and each of the one more discrete structures may be related to one or more discrete areas. Control panel 130 may be a home automation system control panel or security control panel, for example an interactive panel mounted on a wall in a user's home. Control panel 130 may be in direct communication via wired or wireless communication links 140 with the one or more sensor units 110, or may receive sensor data from the one or more sensor units 110 via local computing device 115 and network 120, or may receive data via remote computing device 135, 145, server 125, and/or network 120.

In any embodiment, control panel 130 may comprise any of a speaker, a microphone, a video monitoring component (e.g., two-way communication camera), or a combination thereof, described in more detail below with respect to FIG. 2. The control panel 130 may be operable to broadcast audio communications from the remote computing device 135, 145, or to detect audio input at the control panel 130 and communicate the audio to the remote computing device 135, 145, or a combination thereof. The control panel 130 may also be operable to broadcast video communications from the remote computing device 135, 145, or to record live video at the control panel 130 and communicate the live video to the remote computing device 135, 145, or a combination thereof. In other embodiments, control panel 130 may be operable to receive audio input, video input, and/or an inputted call initiation instruction from one or more sensor units 110 and transmit the audio input, video input, and/or inputted call initiation instruction to remote computing device 135, 145, or to broadcast audio and/or video communications from the remote computing device 135, 145 to the one or more sensor units 110, or a combination thereof. In still other embodiments, control panel 130 may be operable to receive audio input, video input, and/or inputted call initiation instruction from local computing device 115 and transmit the audio input, video input, and/or inputted call initiation instruction to remote computing device 135, 145, or to broadcast audio and/or video communications from the remote computing device 135, 145 to the local computing device 115, or a combination thereof. In some embodiments, control panel 130 may communicate the inputted call initiation instruction to a server 125 for processing. In some embodiments, the control panel 130 may include or be in communication with a camera. In some embodiments, the control panel 130 or the camera may include an interactive surface (e.g., touch screen, push buttons) on which a user may perform one or more inputs. In other embodiments, the camera may be a stand-alone camera. The stand-alone camera may be located within a home. In some embodiments, the stand-alone camera may not include any display screen (e.g., GUI interfaces) and may operate based only on audible commands and/or tactile inputs received by one or more buttons or actuators.

The home automation system may comprise one or more local computing devices 115, which may be dispersed throughout the home automation system 100, where each local computing device 115 may be stationary and/or mobile. Local computing device 115 may be a custom computing entity configured to interact with one or more sensor units 110 and/or control panel 130 via network 120, and in some embodiments, via server 125. In other embodiments, local computing device 115 may be a general purpose computing entity. A local computing device 115 may have an audio and/or a video component, and may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a sensor, and/or the like. A local computing device 115 may also include or be referred to by those skilled in the art as a user device, a sensor, a smartphone, an iPod®, an iPad®, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

A local computing device 115, one or more sensor units 110, and/or control panel 130 may include and/or be one or more sensors that sense communication- and/or security-related data, including but not limited to: proximity, motion, temperatures, humidity, sound level, smoke, structural features (e.g., glass breaking, window position, door position), time, geo-location data of a user and/or a device, distance, biometrics, weight, speed, height, size, preferences, light, darkness, weather, time, system performance, vibration, respiration, heartbeat, and/or other inputs that relate to a security and/or an automation system. Furthermore, local computing device 115, one or more sensor units 110, and/or control panel 130 may comprise a speaker and/or microphone audio component. Local computing device 115, one or more sensor units 110, and/or control panel 130 may additionally or alternatively comprise a video monitoring and/or video display component. A local computing device 115 may be able to communicate through one or more wired and/or wireless communication links 140 with various components such as control panels, base stations, and/or network equipment (e.g., servers, wireless communication points, etc.) and/or the like within the home, and may further be able to communicate through one or more wired and/or wireless communication links 140 with remote users via a network 120 and a remote computing device 135, 145 associated with one or more remote users.

Remote computing device 135, 145 may be, in some embodiments, a central security operating station, where the central security operating station is configured to monitor security data for the home automation system. An operator or dispatcher located at the central security operating station may receive security alerts and alarms from the home automation system and may attempt to establish one- or two-way communication with occupants in the home via the home automation system. In other embodiments, remote computing device 135, 145 may be a personal computing device, such as a smartphone, tablet, or personal computer, which a remote user may use to establish one- or two-way communication with occupants in the home. For example, a remote user may attempt to call his family from his smartphone when he is travelling, and may do so via the home automation system. In further embodiments, remote computing device 135, 145 may be, for example, a stand-alone two-way communication camera, a personal computing device, such as a smartphone, tablet, or personal computer, in the possession of a remote user and at which call requests from a user(s) inside the home are received. Where the remote user accepts the call request, a two-way audio, one-way video, and/or two-way video call may be established between the user(s) inside the home and the remote user.

The communication links 140 shown in home automation system 100 may include uplink (UL) transmissions from a local computing device 115 to a control panel 130, and/or downlink (DL) transmissions from a control panel 130 to a local computing device 115. The communication links 140 may further or alternatively include uplink (UL) transmissions from a local computing device 115, one or more sensor units 110, and/or control panel 130 to remote computing device 135, 145, and/or downlink (DL) transmissions from the remote computing device 135, 145 to local computing device 115, one or more sensor units 110, and/or control panel 130. The downlink transmissions may also be called forward link transmissions while the uplink transmissions may also be called reverse link transmissions. Each communication link 140 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 140 may transmit bidirectional communications and/or unidirectional communications. Communication links 140 may include one or more connections, including but not limited to, 345 MHz, Wi-Fi, Bluetooth, cellular, Z Wave, 802.11, peer-to-peer, LAN, WLAN, Ethernet, fire wire, fiber optic, and/or other connection types related to security and/or automation systems.

In some embodiments of home automation system 100, control panel 130, one or more sensor units 110, and/or local computing device 115 may include one or more antennas for employing antenna diversity schemes to improve communication quality and reliability between control panel 130, one or more sensor units 110, and local computing device 115. Additionally or alternatively, control panel 130, one or more sensor units 110, and/or local computing device 115 may employ multiple-input, multiple-output (MIMO) techniques that may take advantage of multi-path, mesh-type environments to transmit multiple spatial layers carrying the same or different coded data.

Local computing device 115 may communicate directly with one or more other devices via one or more direct communication links 140. Two or more local computing devices 115 may communicate via a direct communication link 140 when both local computing devices 115 are in the geographic coverage area or when one or neither local computing device 115 is within the geographic coverage area. Examples of direct communication links 140 may include Wi-Fi Direct, Bluetooth, wired, and/or other P2P group connections. The local computing devices 115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within home automation system 100.

In some embodiments, one or more sensor units 110 may communicate via wired or wireless communication links 140 with one or more of the local computing device 115 or network 120. The network 120 may communicate via wired or wireless communication links 140 with the control panel 130 and the remote computing device 135, 145 via server 125. In alternate embodiments, the network 120 may be integrated with any one of the local computing device 115, server 125, or remote computing device 135, 145, such that separate components are not required. Additionally, in alternate embodiments, one or more sensor units 110 may be integrated with control panel 130, and/or control panel 130 may be integrated with local computing device 115, such that separate components are not required.

The local computing device 115 and/or control panel 130 may include memory, a processor, an output, a data input, and/or a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing device 115 and/or control panel 130 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from one or more sensor units 110.

The processor of the local computing device 115 and/or control panel 130 may be operable to control operation of the output of the local computing device 115 and/or control panel 130. The output may be a television, a liquid crystal display (LCD) monitor, a cathode ray tube (CRT) monitor, speaker, tactile output device, and/or the like. In some embodiments, the output may be an integral component of the local computing device 115. Similarly stated, the output may be directly coupled to the processor. For example, the output may be the integral display of a tablet and/or smartphone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing device 115 and/or control panel 130 to the output.

The remote computing device 135, 145 may be a computing entity operable to enable a remote user or operator to accept a call request received from one or more of the control panel 130, local computing device 115, and/or one or more sensor units 110. The remote computing device 135, 145 may be functionally and/or structurally similar to the local computing device 115 and may be operable to receive data streams from and/or send signals to at least one of the sensor units 110, or the control panel 130, and/or local computing device 115, via the network 120. The network 120 may be the Internet, an intranet, a personal area network, a local area network (LAN), a wide area network (WAN), a virtual network, a telecommunications network implemented as a wired network and/or wireless network, etc. The remote computing device 135, 145 may receive and/or send signals over the network 120 via communication links 140 and server 125.

In some embodiments, the one or more sensor units 110, control panel 130, and/or local computing device 115 may be sensors configured to conduct periodic and/or ongoing automatic measurements related to call initiation instructions, video input, and/or audio input. Each sensor unit 110, control panel 130, and/or local computing device 115 may be capable of sensing multiple parameters, or alternatively, separate sensor units 110, control panels 130, and/or local computing devices 115 may monitor separate parameters. For example, one sensor unit 110 may include video monitoring components, while a control panel 130 (or, in some embodiments, the same or a different sensor unit 110) may detect audio input, for example from a user speaking a call initiation instruction. In some embodiments, a local computing device 115 may additionally monitor alternate parameters, such as gestural commands to initiate a call. In alternate embodiments, a user may input a call initiation instruction directly at the local computing device 115 or control panel 130. For example, a user may press a button on a control panel associated with initiating a call to a particular or general remote user, and this call initiation instruction may be communicated to the remote computing device 135, 145 accordingly.

In some embodiments, the one or more sensor units 110 may be separate from the control panel 130, and may be positioned at various locations throughout the home or property. The one or more sensor units 110 may include the designated hardware and/or software to receive a call initiation instruction, analyze the call initiation instruction, and communicate a call request to a remote user independent of other system components, such as control panel 130. In other embodiments, the one or more sensor units 110 may be integrated or collocated with one or more home automation system components or home appliances or fixtures. For example, a sensor unit 110 may be integrated with a doorbell system, or may be integrated with a front porch light. In other embodiments, a sensor unit 110 may be integrated with a wall outlet or switch. In still other embodiments, the one or more sensor units 110 may be integrated or collocated with the control panel 130 itself. In any embodiment, each of the one or more sensor units 110, control panel 130, and/or local computing device 115 may comprise a video monitoring unit, a video display unit, a speaker unit, or a microphone unit, or a combination thereof.

In some embodiments, sensor units 110 may comprise sensor modules retrofitted to existing mobile robotic device platforms, for example an iRobot Roomba®. The sensor units 110 integrated with or attached to the mobile robotic device may therefore be mobile throughout the home or property to detect video, audio, and/or inputted call initiation instructions, or to broadcast video and/or audio received from the remote computing device 135, 145, or a combination thereof. The mobile robotic devices may be operable to locate users in the home based on motion detection, sound detection, heartbeat or breathing detection, or any other known means. Alternatively or in addition, the mobile robotic devices may be operable to relocate to users in the home based on instructions received from a component of the home automation system or the remote computing device 135, 145. In this way, one-way and/or two-way communication may be established between the remote computing device 135, 145 and users in the home, regardless of the location of sensor units 110 or control panels 130.

Audio, video, and/or inputted call initiation instructions gathered by the one or more sensor units 110 may be communicated to local computing device 115, which may be, in some embodiments, a thermostat, control panel, or other wall-mounted input/output home automation system display. In other embodiments, local computing device 115 may be a personal computer or smartphone. Where local computing device 115 is a smartphone, the smartphone may have a dedicated application directed to collecting user inputted call initiation instructions, video, and audio data and facilitating one-way and/or two-way communication with outside callers. The local computing device 115 may communicate the received inputted call initiation instructions, video, and/or audio data to the remote computing device 135, 145. In other embodiments, audio, video, and/or inputted call initiation instructions collected by the one or more sensor units 110 may be communicated to the control panel 130, which may communicate the collected audio, video, and/or inputted call initiation instructions to the remote computing device 135, 145. In still other embodiments, audio, video, and/or inputted call initiation instructions collected by the one or more sensor units 110 may be communicated directly to the remote computing device 135, 145 via network 120, and in some embodiments, additionally through remote server 125. Data transmission may occur via, for example, frequencies appropriate for a personal area network (such as Bluetooth or IR communications) or local or wide area network frequencies such as radio frequencies specified by the IEEE 802.15.4 standard.

In addition, audio and/or video may be broadcast from the remote computing device 135, 145 to any of the one or more sensor units 110, local computing device 115, or control panel 130, or a combination thereof. The broadcasted audio and/or video may be communicated directly to the one or more sensor units 110, local computing device 115, or control panel 130 via network 120, or may first be communicated to remote server 125. In addition, audio and/or video broadcasts communicated to one or more sensor units 110 from remote computing device 135, 145 may first be communicated via network 120 to control panel 130 and/or local computing device 115.

In some embodiments, one or more sensor units 110, local computing device 115, or control panel 130 may communicate with remote computing device 135, 145 via network 120 and server 125. Examples of networks 120 include cloud networks, local area networks (LAN), wide area networks (WAN), virtual private networks (VPN), wireless networks (using 802.11, for example), and/or cellular networks (using 3G and/or LTE, for example), etc. In some configurations, the network 120 may include the Internet.

The server 125 may be configured to communicate with the sensor units 110, the local computing device 115, the remote computing device 135, 145, and control panel 130. The server 125 may perform additional processing on signals received from the one or more sensor units 110, control panel 130, or local computing device 115, or may simply forward the received information to the remote computing device 135, 145. For example, server 125 may receive a call initiation instruction from one or more sensor units 110, and may receive a call acceptance from remote computing device 135. Based on the received call initiation instruction, the server 125 may facilitate initiation of a two-way call between a remote user at remote computing device 135 and a component of the home automation system, such as a control panel 130, local computing device 115, and/or one or more sensor unit 110. In this way, the home automation system, via the server 125, may automatically facilitate two-way calls between a home occupant and a remote user.

Server 125 may be a computing device operable to receive data streams (e.g., from one or more sensor units 110, control panel 130, local computing device 115, and/or remote computing device 135, 145), store and/or process data, and/or transmit data and/or data summaries (e.g., to remote computing device 135, 145). For example, server 125 may receive a call initiation instruction received at a control panel 130, a stream of video data from a sensor unit 110, and a stream of audio data from the same and/or a different sensor unit 110. In some embodiments, server 125 may "pull" the data streams, e.g., by querying the sensor units 110, the local computing device 115, and/or the control panel 130. In some embodiments, the data streams may be "pushed" from the sensor units 110, control panel 130, and/or the local computing device 115 to the server 125. For example, the sensor units 110, control panel 130, and/or the local computing device 115 may be configured to transmit data as it is generated by or entered into that device. In some instances, the sensor units 110, control panel 130, and/or the local computing device 115 may periodically transmit data (e.g., as a block of data or as one or more data points).

The server 125 may include a database (e.g., in memory) containing call initiation instructions, video, and/or audio data received from the one or more sensor units 110, control panel 130, and/or the local computing device 115. Additionally, as described in further detail herein, software (e.g., stored in memory) may be executed on a processor of the server 125. Such software (executed on the processor) may be operable to cause the server 125 to monitor, process, summarize, present, and/or send a signal associated with call initiation instructions, video, and/or audio data.

Figure 2:
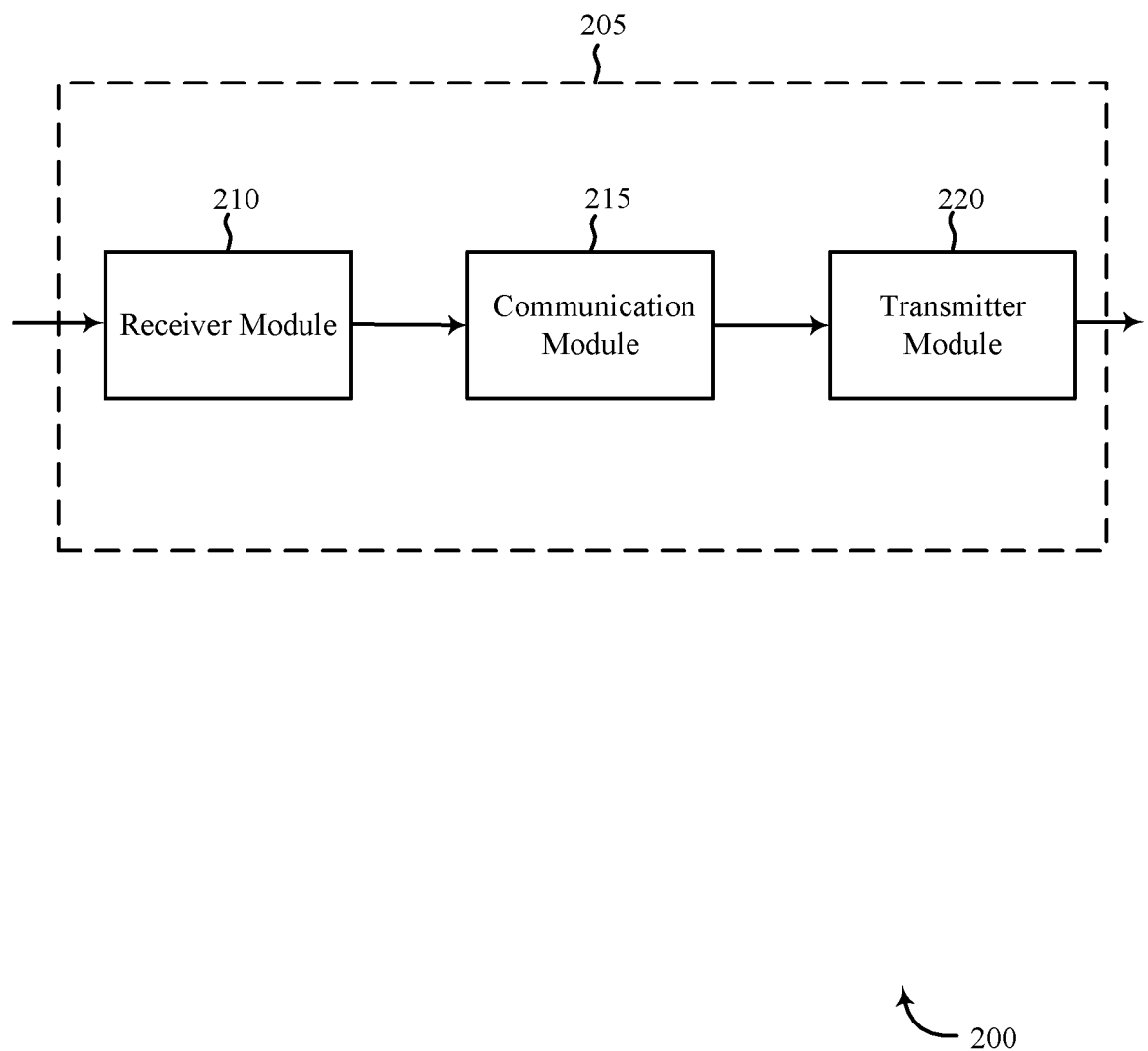
FIG. 2 shows a block diagram of a device relating to a security and/or an automation system, in accordance with various aspects of this disclosure.

FIG. 2 shows a block diagram 200 of an apparatus 205 for use in electronic communication, in accordance with various aspects of this disclosure. The apparatus 205 may be an example of one or more aspects of a control panel 130 or a camera, and/or in other embodiments may be an example of one or more aspects of the one or more sensor units 110, and/or in other embodiments may be an example of one or more aspects of the local computing device 115, each of which is described with reference to FIG. 1. The apparatus 205 may include any of a receiver module 210, a communication module 215, and/or a transmitter module 220, among others. The apparatus 205 may also be or include a processor. Each of these modules may be in communication with each other—directly and/or indirectly.

As previously discussed, in some embodiments, where apparatus 205 is a control panel, apparatus 205 may be a control panel in the form of, for example, an interactive home automation system display or apparatus 205 may be a stand-alone camera. In other embodiments, apparatus 205 may be a local computing device, such as a personal computer or smartphone. In still other embodiments, apparatus 205 may be at least one sensor unit. In any embodiment, apparatus 205 may include any of audio and/or video detection components, or audio and/or video projection components, or a combination thereof (e.g., a camera such as a stand-alone camera).

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive a call initiation instruction from a home occupant. The call initiation instruction may be received in the form of a verbal command, a gestural command, a user input at a user interface of a home automation system component, and/or a combination thereof. Received call initiation instructions may be passed on to a communication module 215, which may analyze the received call initiation instruction and derive a call request accordingly. In addition, the communication module 215 may communicate the derived call request to a transmitter module 220, and/or to other components of the apparatus 205. The transmitter module 220 may then communicate the call request to a remote computing device or to a local server.

The receiver module 210 may additionally be configured to receive a call acceptance from one or more remote users (e.g., the first remote user) to whom the call request is communicated by transmitter module 220. For example, the first remote user may receive a call request at his personal computing device, such as a smartphone, tablet, or computer, and may accept the call request. The call acceptance may be received at receiver module 210, for example, via a server. The call acceptance may be communicated from receiver module 210 to communication module 215, and communication module 215 may initiate a two-way call between the home occupant and the first remote user.

In some examples, where apparatus 205 is an example of a sensor unit or control panel having video monitoring and video display components, the two-way call may be facilitated locally by apparatus 205. For example, the home occupant may be able to speak into or at the apparatus 205, and may hear and/or see responses from the first remote user at the apparatus 205. In other examples, where apparatus 205 is an example of a sensor unit or control panel not having video monitoring and/or video display components, the two-way call may be routed through the apparatus 205 to a separate component of the home automation system having video monitoring and display components, such that the home occupant may conduct the two-way call with the first remote user.

In some examples, where apparatus 205 is an example of a sensor unit or control panel lacking video monitoring and video display components, a one-way video call may be facilitated locally by apparatus 205. For example, the home occupant may be able to speak into or at the apparatus 205, and may hear responses from the first remote user at the apparatus 205 while the first remote user may receive video data from the apparatus 205.

Figure 3:
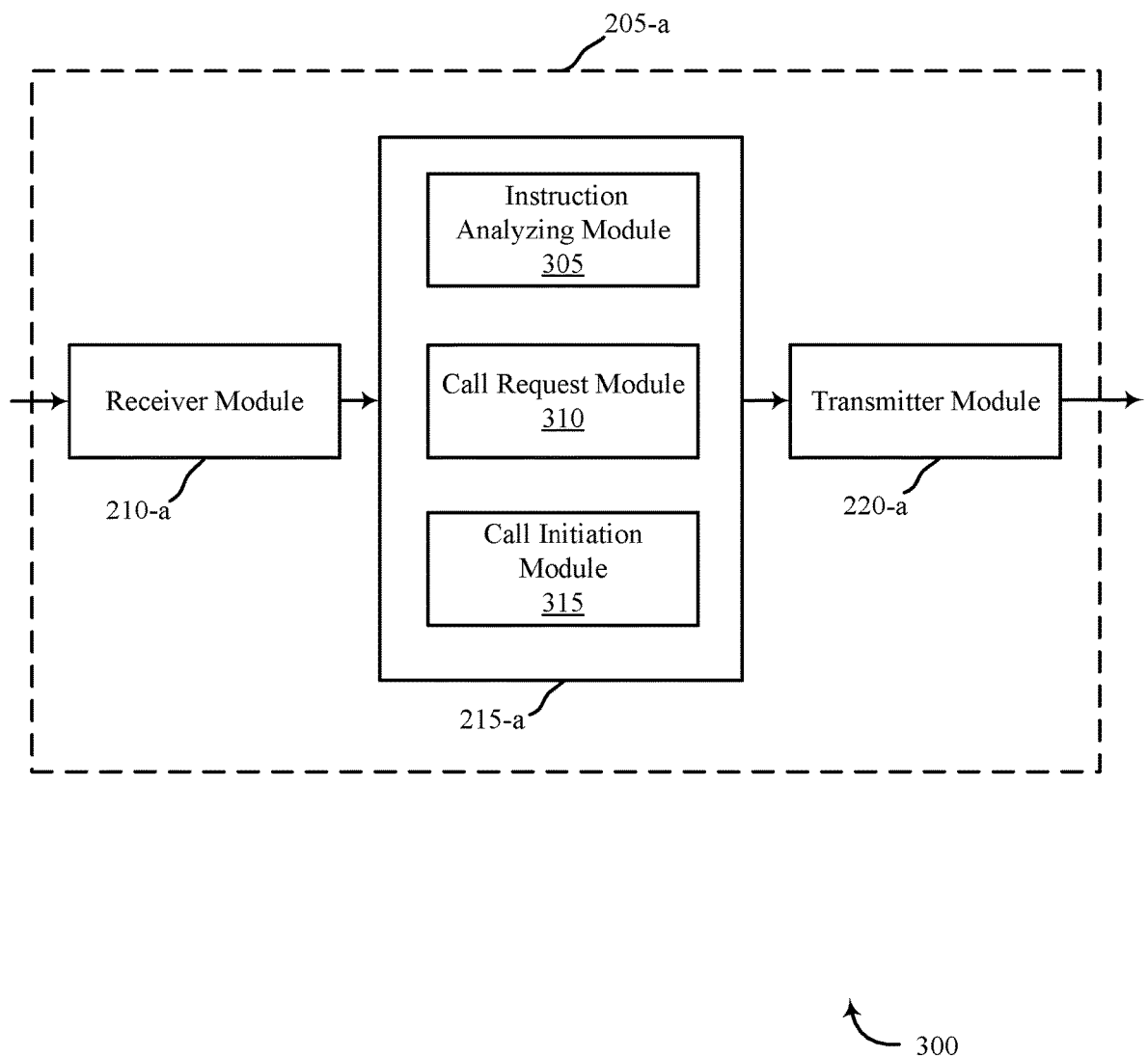
FIG. 3 shows a block diagram of a device relating to a security and/or an automation system, in accordance with various aspects of this disclosure.

Apparatus 205-*a*, which may be an example of apparatus 205 illustrated in FIG. 2, is further detailed in FIG. 3. Apparatus 205-*a* may comprise any of a receiver module 210-*a*, a communication module 215-*a*, and/or a transmitter module 220-*a*, each of which may be examples of the receiver module 210, the communication module 215, and the transmitter module 220 as illustrated in FIG. 2. Apparatus 205-*a* may further comprise, as a component of the communication module 215-*a*, any of an instruction analyzing module 305, a call request module 310, and/or a call initiation module 315, among others.

The components of apparatus 205-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

Where apparatus 205-*a* is any of a sensor unit, control panel or camera, or local computing device, receiver module 210-*a* may be operable to receive a call initiation instruction from a home occupant. The call initiation instruction may be received in the form of a verbal command, a gestural command, an input at a user interface, a tactile input, and/or any combination thereof. Where apparatus 205-*a* includes a video monitoring component, the call initiation instruction may be received directly at apparatus 205-*a*. In other examples, where apparatus 205-*a* does not include a video monitoring component, the call initiation instruction may be received at a component of the home automation system having a video monitoring component, and the call initiation instruction may be communicated from that component to apparatus 205-*a*. In other embodiments, the apparatus 205-*a* may receive a request to establish a wireless communication link with a camera associated with an entrance to a structure (e.g., home, business, etc.). For instance, sensors 110 and/or the camera may detect motion outside the structure and transmit an alert to the home automation system. The home automation system may then transmit a notification to a device associated with a user that is located inside the structure, and alert the user of the detected motion. In some embodiments, the home automation system may transmit a notification to a device associated with a user that is located a predetermined distance (e.g., within a boundary) from the structure and alert the user of the detected motion. In some embodiments, the apparatus 205-*a* which may be inside the structure may receive the request to establish a wireless communication with the camera located at the entrance of the structure. The wireless communication may include, but is not limited to, the camera or the apparatus 205-*a* transmitting audio data, video data, or a combination of both to a device of the user. In some embodiments, the camera located at the entrance of the structure may receive audio data from the remote device of the user and broadcast the audio data to apparatus 205-*a* or one or more others devices.

In some embodiments, the control panel 130 may receive a tactile input. In some embodiments, a tactile input may include, but is not limited to, a tap, a double tap, a drag, a flick, a rotate, a spread, or a pinch, among others. In one embodiment, a user may perform a tap on a display of the control panel 130 that may indicate a request to establish a wireless communication link between the control panel 130 and at the local computing device 115 and/or the remote computing device 135, 145. For instance, a user may navigate to a stored phone directory based on one or a combination of tactile inputs performed on a display on the control panel 130. In one embodiment, the one or the combination of tactile inputs may be different. In other embodiments, the one or the combination of tactile inputs may be same.

In some embodiments, the camera may receive a tactile input that may indicate a request to establish a wireless communication link between the camera and one or more other devices (e.g., the local computing device 115 and/or the remote computing device 135, 145). In some embodiments, a tactile input may include, but is not limited to, a tap, a double tap, a drag, a flick, a rotate, a spread, or a pinch, among others. In some cases, the tactile input may be performed on a button or on multiple buttons that are configured to detect different types and variations of tactile inputs. In some embodiments, the camera may receive a call initiation instruction for initiating a call with a remote user associated with the home automation system. For example, a user may provide a general input, such as pushing a button and a general call may be placed to any member of the family or other remote user associated with the home automation system. In some embodiments, the camera may include, but is not limited to, a single button. In some embodiments, the camera may include, but is not limited to, multiple buttons. A user may press and/or depress a button that may be indicative that the user wishes to initiate a call between the camera and another device (e.g., remote computing device 135, 145 and/or local computing device 115). For instance, a child at home may want to call his mother, the child may perform a single actuation of a single button on the camera that may initiate a call to a device associated with the mother. In some embodiments, the camera is operable independent of a display component (e.g., GUI interface). In other embodiments, the camera independent of the display component may transmit audio and/or video to a remote device. In some cases, the camera independent of the display component may receive and broadcast the received audio. In further cases, the camera independent of the display component may receive video and transmit video to one or more home automation components for displaying the video. In some cases, having a camera independent of a display component may provide advantages including simplifying manufacturing, decreasing visibility and detection, decreasing costs, and enabling operations through alternative input methods.

In some embodiments, the control panel 130 and/or the camera may receive one or a combination of inputs. The one or the combination of inputs may include, but is not limited to, a combination of direct inputs and/or a combination of indirect inputs. A direct input may be, for example, a user pushing a button on the control panel 130 and/or the camera. An indirect input may be, for example, a user performing a gesture in-line of sight at the location of the control panel 130 and/or the camera. For example, in one embodiment, the control panel 130 and/or the camera may receive a first tactile input (e.g., a user interacting with a display of the control panel 130, or a user pushing a button on the camera), subsequent to receiving the first tactile input, a video monitoring component associated with the control panel 130 and/or the camera may receive a second input. In some embodiments, the first input may be a tactile input associated with a user actuating a button on the camera. In some cases, performing the first input may be an indication to the home automation system that a second input (e.g., gesture) is in queue or will be performed before or after the first input. One or more component of the home automation system may analyze the second input in the queue (or performed before or after the first input) based on receiving the first input (e.g., tactile input). A second input that is in queue, may be indicative of, but is not limited to, a user performing a gesture in real-time, in a line of sight of the camera. For example, the second input may be associated with a gesture (e.g., hand movement) that may indicate a request to call a particular person. In some embodiments, the second input received may be a captured image, audio, and/or video of the person at the location of the control panel 130 and/or the camera. The control panel 130 and/or the camera may transmit the captured image, audio, and/or video to the instruction analyzing module 305 to determine an identity of the person. In some embodiments, the captured image, audio, and/or video may be captured by the sensors 110 and/or the audio component and/or the video component of the local computing device. In some embodiments, the first input and the second input may be performed by a user simultaneously and the control panel 130 and/or the camera may receive the first input and the second input concurrently.

In some embodiments, the call initiation instruction (e.g., tactile input) may be associated with a duration. For example, the control panel 130 and/or the camera may initiate a call to a person based on receiving a tactile input for a predetermined duration (e.g., 1 second, 3 seconds, 10 seconds, a minute) or multiple tactile inputs during a predetermined duration. In other embodiments, call initiation instruction (e.g., tactile input) may be associated with a number of times that the call initiation instruction (e.g., tactile input) is received. For instance, the control panel 130 and/or the camera may determine that to initiate a call based on receiving a tactile input for a predetermined duration and/or a number of times. In other embodiments, call initiation instruction (e.g., tactile input) may be associated with whether different types of tactile inputs are performed during or separate from a predetermined duration. For example, receiving a first tactile input type and second tactile input type may initiate a call initiation instruction to a first contact, while receiving a second tactile input type and third tactile input type may initiate a call initiation instruction to a second contact. In some cases, the tactile input types may be the same, while in other cases the tactile input types may be different (e.g., long/short, tap/double tap, hold/tap). In other embodiments, the control panel 130 and/or the camera in communication with one or more other components of the home automation system may identify a predetermined contact to establish the call based on the predetermined duration of the tactile input, or the number of times one or more tactile inputs is received, or a combination thereof.

In further embodiments, the control panel 130 and/or the camera may be programmed with contacts. For instance, the control panel 130 and/or the camera may have a group of predefined contacts stored in memory, which may be based on contacts associated with a home automation system (e.g., a parent who is the local administrator, or a grandparent identified as an emergency contact, a neighbor, an emergency contact). Upon receipt of the call initiation instruction, either locally at apparatus 205-*a* and/or by transmission to apparatus 205-*a* from a remote component of the home automation system, receiver module 210-*a* may communicate the call initiation instruction to instruction analyzing module 305. In some embodiments, the either locally at apparatus 205-*a* and/or by transmission to apparatus 205-*a* from a remote component of the home automation system, receiver module 210-*a* may communicate the tactile input to instruction analyzing module 305. Instruction analyzing module 305 may analyze the received call initiation instruction in order to determine the appropriate recipients of a call request, a determined urgency of the call request, an identity of one or more users making the call request, the subject of the call request, and/or some combination, among other things.

In some embodiments, the instruction analyzing module 305 may determine an urgency of the call request based on the characteristic of the tactile input. In some embodiments, the instruction analyzing module 305 may determine an urgency of the call request based on the characteristic of the tactile input and an identity of the user requesting the call. The instruction analyzing module 305 may determine that a child is attempting to call his mom urgently based on the characteristic of the tactile input (e.g., frequency of the tactile input). For example, a user may have a pre-configured behavior (e.g., sequence, duration) associated with inputs (e.g., tactile input, gesture) received at the control panel 130 and/or the camera. If the instruction analyzing module 305 determine that the user's current input (e.g., tactile input, gesture) deviates from the users pre-configured behavior, the instruction analyzing module 305 may determine that the call is urgent and initiate the call immediately. In some embodiments, the instruction analyzing module 305 may identify a predetermined contact based on the urgency of the call request. For example, the instruction analyzing module 305 may identify that the predetermined contact is an emergency contact (e.g., police dispatch) based on determining comparing that the user's current input (e.g., tactile input, gesture) deviates from the users pre-configured behavior.

In some embodiments, the instruction analyzing module 305 may analyze the received tactile input in order to identify a predetermined contact. In one embodiment, the instruction analyzing module 305 may identify a predetermined contact based on one or more characteristics of the tactile input. In other embodiments, the analyzing module 305 may identify a characteristic associated with the tactile input. For example, where the home occupant has provided a call initiation instruction as a gestural command, instruction analyzing module 305 may compare the detected gestures with a database of known gestures, such as hand signals or the like, and corresponding call request recipients. In some embodiments, the instruction analyzing module 305 may analyze audio input, video input, or some combination thereof. In one the received audio input, video input, or some combination thereof with stored profile information. The stored profile information may be, but is not limited to, a particular user associated with the home automation system.

In other examples, where the home occupant has provided a verbal command, instruction analyzing module 305 may compare the detected audio with a database of known command keywords or phrases and corresponding call request recipients. In other examples, where the home occupant has provided a verbal command, instruction analyzing module 305 may compare the detected audio with a database of known user profiles (e.g., including voice inflection, tone, vocabulary, embodiment, the instruction analyzing module 305 may compare pronunciation, and/or some combination, among others) and corresponding call request recipients. In some embodiments, these techniques may be based on segmenting the call request and comparing one or more segments to pre-recorded data, past call requests, a database of stored call request-related information, and/or other information to aid in the analysis and perform related call request actions. In some embodiments, these techniques may be based on analyzing the entire call request and comparing the call request and/or some portion of the call request to other information, including but not limited to past call requests, pre-recorded pronunciations and/or video recordings relating to one or more users, gesture based detection using image data (e.g., photo, video, combination), and the like.

In some embodiments, the instruction analyzing module 305 may identify a predetermined contact to call based at least in part on a duration of and/or a number of times that the tactile input is received. For example, the instruction analyzing module 305 may determine a duration of and/or a number of times that a button (or buttons) associated with the control panel 130 and/or the camera is/are pressed. In some embodiments, the camera may determine which contact to call or what action to complete based at least in part on an amount of time that the button of the camera is pressed during a certain period. For example, a child may want to call his/her mom, the child may request the control panel 130 and/or the camera to call his/her mom based on pressing the button at the control panel 130 and/or the camera for a certain duration (e.g., 2 seconds). In some embodiments, the child may want to call his/her dad, the child may request the control panel 130 and/or the camera to call his/her dad based at least in part on pressing the button at the camera for a different duration (e.g., 4 seconds) or in a different pattern (e.g., long actuation followed by short tap actuation). In some embodiments, the instruction analyzing module 305 may determine which predetermined contact to call based at least in part on a duration the button(s) of the camera and/or the control panel 130 is pressed and/or another type of input received (e.g., audio, gesture, video) during a certain period.

In either example, instruction analyzing module 305 may further analyze the instruction to determine an identity of the home occupant issuing the command. For example, instruction analyzing module 305 may receive facial data and/or body data (e.g., height, weight, shape, eye color, hair color, face shape, etc.) associated with the home occupant from one or more sensor units and may compare that data with a database of known home occupant identities in order to identify the occupant. In another example, instruction analyzing module 305 may conduct voice analysis by comparing audio detected by one or more sensor units with a database of vocal identification data to determine the identity of a home occupant speaking a verbal call initiation command. Thus, for example, where a home occupant speaks a command to "call mom," instruction analyzing module 305 may use facial, body, and/or voice recognition means to determine whether the home occupant is a child in the home, instructing the system to call his parent, or whether the home occupant is an adult in the home, instructing the system to call her parent (the child's grandparent).

In some embodiments, the instruction analyzing module 305 may further analyze an input (e.g., direct inputs, indirect inputs) by comparing one or more characteristics associated with the input with a predetermined input sequence during a period. In some embodiments, the instruction analyzing module 305 may compare the characteristic of the tactile input with a predetermined tactile input sequence during a period. In one embodiment, the predetermined tactile input sequence may be stored in a database and retrieved by one or more components of the home automation system for performing the comparison. In other embodiments, the predetermined tactile input sequence may be generated by an algorithm of the home automation system based on a learning training sequence. For instance, the apparatus 205-a may receive input data from the local computing device 115, control panel 130, remote computing device 135, 145, and/or the camera that corresponds to past and present inputs associated with a call initiation request. In some embodiments, the input sequence may include, but is not limited to, a user-defined input sequence, an input sequence associated with a user profile, a system-defined input sequence, or a combination thereof. In some embodiments, a user may define a particular sequence and/or sequences that a user performs and store it in memory of one or more components of the home automation system. In some cases, each user defined sequence and/or sequences may be stored and correlated with a user profile associated with the home automation system. In other embodiments, the instruction analyzing module 305 may identity the characteristic of the sequence (e.g., call instruction, tactile input) based on comparing the characteristic of the sequence with any of the user-defined input sequence, the input sequence associated with the user profile, the system-defined input sequence, or a combination thereof. For instance, the instruction analyzing module 305 may identify that based on the sequence of the tactile input a user wishes to call his mom.

In some examples, analysis of the call initiation instruction by instruction analyzing module 305 may lead to communicating the call request to one or more second remote user. For example, a child may have inputted a call request as a gestural command at a video monitoring component of a control panel (apparatus 205-a). Instruction analyzing module 305 may analyze the gestural command and/or one or more characteristics (e.g., voice characteristics, physical characteristics, etc.) the identity of the requesting child, and may derive an instruction to send a call request to the child's father. This call request may be communicated to call request module 310, which may in turn communicate the call request to the child's father via transmitter module 220-*a*. If, in this example, the father rejects the call request, the call request rejection (and/or information derived from the call request rejection) may be received by receiver module 210-*a* and communicated to instruction analyzing module 305. Based at least in part on analyzing the call initiation instruction and identifying the requesting child, instruction analyzing module 305 may derive an instruction to now send a call request to the child's mother, since the child's father was unreachable. This call request may then be communicated to the child's mother via call request module 310 and transmitter module 220-*a*. In some examples, this relay of call requests may be sequential, while in other examples, one or more call requests may be communicated simultaneously to one or more remote users. In this way, a child home alone may initiate a call with a specifically desired recipient, such as his father, or with any recipient of a group. In some embodiments, those included in the group may be based on those who are currently available, as determined by the recipient(s)'s acceptance of the call request, among other factors.

In some embodiments, the call request module 310 may receive an indication from the instruction analyzing module 305 that the predetermined contact is a remote user. The call request module 310 may transmit a notification to an application running on a device of the remote user. The notification may include, but is not limited to, information indicating to the remote user an intent to initiate a two-way communication between the control panel 130 and/or the camera and the remote device. In some embodiments, the call request module 310 may receive a response from the remote device and transmit the response to the call initiation module 315. In some embodiments, the call initiation module 315 may initiate a two-way communication between the camera and the remote device based on the response received. In other embodiments, the call initiation module 315 may establish a wireless communication link between the camera (e.g., inside the home, associated with an entrance to a structure) or another device based at least in part on a request (e.g., tactile input, gesture, verbal command, etc.).

As discussed above, call request module 310 may receive details of the call initiation instruction from instruction analyzing module 305, and may derive a call request to be communicated to the appropriate one or more remote users accordingly. In some examples, the received call initiation instruction may be a generalized instruction to call out. In this example, call request module 310 may derive a call request to one or more remote users associated with the home automation system. Remote users who are associated with the home automation system may be designated as such by input of user preferences at, for example, a control panel associated with the home automation system, among other methods. For example, call request module 310 may derive a call request to all four remote members of the household. In some examples, a call request may be communicated, via transmitter module 220-*a*, to each household member simultaneously. In other examples, a call request may be communicated to each household member sequentially until a call acceptance is received. In the latter example, call request module 310 may access a call priority list, for example inputted by a household member at the home automation system, to indicate an order in which to place the calls. This call priority list may additionally and/or alternatively be based on additional factors and/or data, such as the time of day, location, an electronic calendar appointment, a proximity to a home and/or other location, a relationship (e.g., parent first, sibling second, grandparent third, etc.), some combination, and/or other information. In examples where one or more call rejections are received by receiver module 210-*a*, call request module 310 may derive a new call request to be communicated to one or more alternate remote users to whom a call request has not yet been communicated, or who have not yet returned a call rejection.

Receiver module 210-*a* may receive a call acceptance from the one or more remote users to whom the call request was communicated by call request module 310 via transmitter module 220-*a*. This call acceptance may be communicated from receiver module 210-*a* to call initiation module 315, and call initiation module 315 may initiate a two-way call between the video monitoring component of the home automation system and the accepting remote user. The initiated two-way call may take the form of any of a two-way audio call, a one-way video call, or a two-way video call, or any combination thereof.

Figure 4:
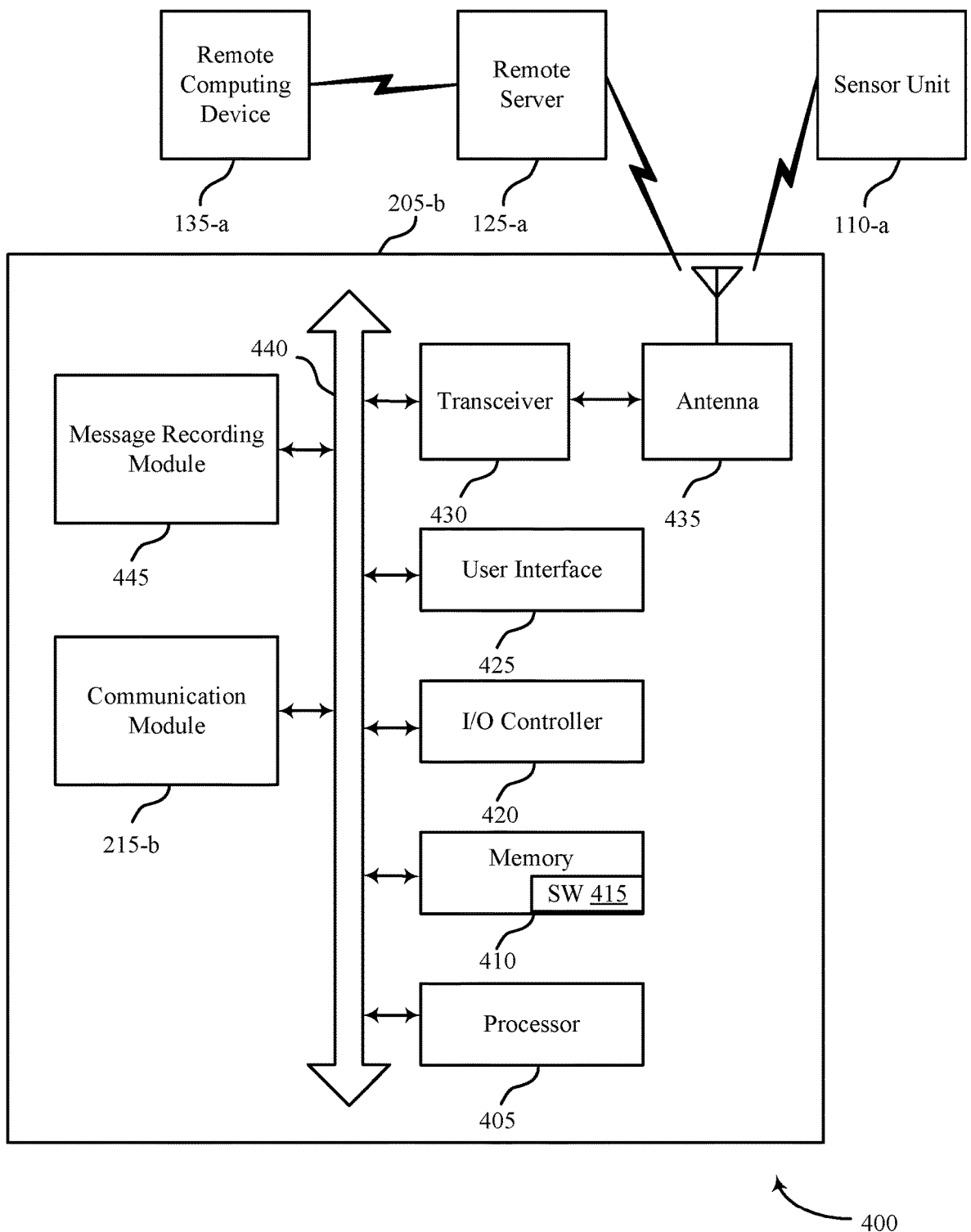
FIG. 4 shows a block diagram relating to a security and/or an automation system, in accordance with various aspects of this disclosure.

FIG. 4 shows a system 400 for use in establishing communication between a video monitoring component of a home automation system and at least one remote user, in accordance with various examples. System 400 may include an apparatus 205-*b*, which may be an example of the control panel 130, local computing device 115, and/or one or more sensor units 110 of FIG. 1, among others. Apparatus 205-*b* may also be an example of one or more aspects of apparatus 205 and/or 205-*a* of FIGS. 2 and 3.

Apparatus 205-*b* may include a communication module 215-*b*, which may be an example of the communication module 215, 215-*a* described with reference to FIGS. 2 and 3. The communication module 215-*b* may analyze received call initiation instructions, derive call requests, and initiate two-way calls, as described above with reference to FIGS. 2-3.

Apparatus 205-*b* may also include components for bi-directional video, voice, and data communications including components for transmitting communications and components for receiving communications. For example, apparatus 205-*b* may communicate bi-directionally with one or more of remote computing device 135-*a*, remote server 125-*a*, or sensor unit 110-*a*. This bi-directional communication may be direct (e.g., apparatus 205-*b* communicating directly with sensor unit 110-*a*) or indirect (e.g., apparatus 205-*b* communicating with remote computing device 135-*a* via remote server 125-*a*). Remote server 125-*a*, remote computing device 135-*a*, and sensor unit 110-*a* may be examples of remote server 125, remote computing device 135, 145, and sensor unit 110 as shown with respect to FIG. 1.

In addition, apparatus 205-*b* may comprise message recording module 445. In some examples, as discussed previously with respect to FIGS. 2 and 3, a call request communicated from apparatus 205-*b* to a remote user may result in a call acceptance, communicated from the remote user and received at apparatus 205-*b*. As a result of this call acceptance, a two-way call may be initiated between apparatus 205-*b* and the remote user, or between a different video monitoring component of the home automation system and the remote user, facilitated via apparatus 205-*b*. In other examples, the remote user may respond to the call request with a rejection. This call rejection may be communicated to apparatus 205-*b*. Where a call rejection is received, message recording module 445 may allow for a recorded message to be communicated to the remote user in lieu of establishing a two-way communication. The recorded message may take the form of any of an audio message, or a video message, or a text message, or a combination thereof, among other forms. Where apparatus 205-b includes an audio and/or video monitoring component, or a user interface, apparatus 205-b may prompt the calling home occupant to record a message for the remote user at apparatus 205-b. In other examples, where apparatus 205-b does not include any of an audio and/or video monitoring component, or a user interface, the home occupant may record the message at a separate component of the home automation system, and the recorded message may be communicated to message recording module 445. Thus, for example, where a home occupant attempts to initiate a call with her husband, and her husband rejects the incoming call request because he is in a meeting, the home occupant may instead record a video message for her husband at a video monitoring component of the home automation system.

The recorded message received by message recording module 445 may be communicated to the remote user via antenna 435 in some examples, and may be delivered to the remote user at remote computing device 135-a, such as a smartphone or personal computing device. The recorded message may be received by the remote user as a push notification or as part of a dedicated application, or may be received as a standard email or SMS text message in other examples. The remote user may then view and/or listen to the recorded message at his convenience. In some examples, the remote user may respond to the received recorded message by recording a message of his own, to be communicated back to the home occupant via apparatus 205-b. In other examples, the remote user may reject a call request, and may respond with a recorded message, in the absence of receiving a recorded message from the calling home occupant. The message recorded by the remote user may similarly take the form of a text message, audio message, and/or video message, and may be delivered, via apparatus 205-b, to the home occupant at any component of the home automation system capable of displaying or broadcasting the message. For example, the home occupant may receive the remote user's recorded message as a text message on a display screen of a control panel, or may hear the remote user's recorded message as it is broadcasted from a speaker component of a sensor unit. Other examples are also envisioned.

Apparatus 205-b may also include a processor module 405, and memory 410 (including software (SW) 415), an input/output controller module 420, a user interface module 425, a transceiver module 430, and one or more antennas 435, each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of remote server 125-a or sensor unit 110-a. The transceiver module 430 may include a modem to modulate the packets and provide the modulated packets to the one or more antennas 435 for transmission, and to demodulate packets received from the one or more antennas 435. While an apparatus comprising a sensor unit, local computing device, or control panel (e.g., 205-b) may include a single antenna 435, the apparatus may also have multiple antennas 435 capable of concurrently transmitting or receiving multiple wired and/or wireless transmissions. In some embodiments, one element of apparatus 205-b (e.g., one or more antennas 435, transceiver module 430, etc.) may provide a direct connection to a remote server 125-a via a direct network link to the Internet via a POP (point of presence). In some embodiments, one element of apparatus 205-b (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z Wave, cellular network (using 3G and/or LTE, for example), and/or other signals. The one or more antennas 435 and/or transceiver module 430 may include or be related to, but are not limited to, WWAN (GSM, CDMA, and WCDMA), WLAN (including Bluetooth and Wi-Fi), WMAN (WiMAX), antennas for mobile communications, antennas for Wireless Personal Area Network (WPAN) applications (including RFID and UWB). In some embodiments each antenna 435 may receive signals or information specific and/or exclusive to itself. In other embodiments each antenna 435 may receive signals or information neither specific nor exclusive to itself.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of apparatus 205-b (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., receive a call initiation instruction, analyze the call initiation instruction, communicate a call request to one or more remote user, initiate a two-way call with the one or more remote user, etc.). Alternatively, the computer-executable software/firmware code 415 may not be directly executable by the processor module 405 but may cause a computer (e.g., when compiled and executed) to perform functions described herein.

In some embodiments the processor module 405 may include, among other things, an intelligent hardware device (e.g., a central processing unit (CPU), a microcontroller, and/or an ASIC, etc.). The memory 410 may contain, among other things, the Basic Input-Output System (BIOS) which may control basic hardware and/or software operation such as the interaction with peripheral components or devices. For example, the communication module 215-b may be stored within the memory 410. Applications resident with system 400 are generally stored on and accessed via a non-transitory computer readable medium, such as a hard disk drive or other storage medium. Additionally, applications may be in the form of electronic signals modulated in accordance with the application and data communication technology when accessed via a network interface (e.g., transceiver module 430, one or more antennas 435, etc.).

Many other devices and/or subsystems may be connected to, or may be included as, one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be understood by a person of ordinary skill in the art and is not discussed in detail in this disclosure. Code to implement the present disclosure may be stored in a non-transitory computer-readable medium such as one or more of memory 410 or other memory. The operating system provided on I/O controller module 420 may be iOS®, ANDROID®, MS-dOS®, MS-WINDOWS®, OS/2®, UNIX®, LINUX®, or another known operating system.

The components of the apparatus 205-b may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

Figure 5:
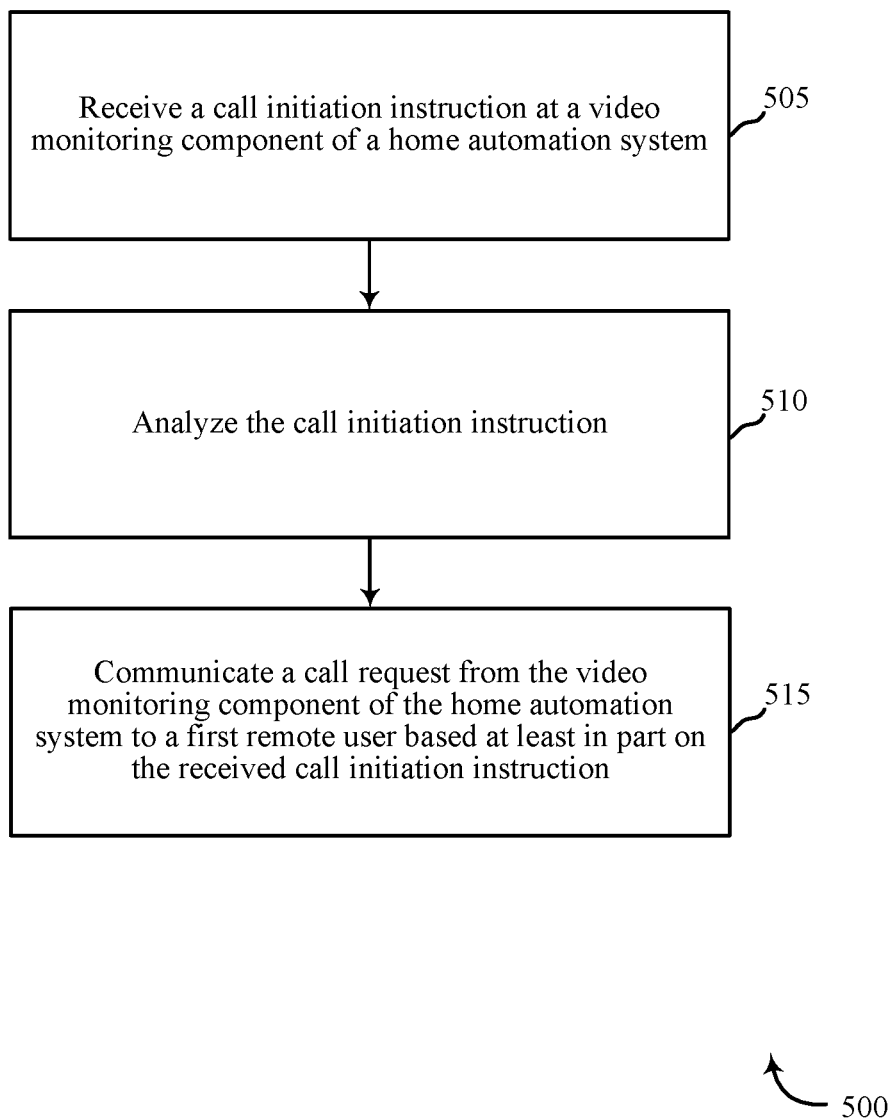
FIG. 5 is a flow chart illustrating an example of a method relating to a security and/or an automation system, in accordance with various aspects of this disclosure.

FIG. 5 is a flow chart illustrating an example of a method 500 for establishing two-way communication between a video monitoring component of a home automation system and a first remote user. For clarity, the method 500 is described below with reference to aspects of one or more of the sensor units 110, local computing device 115, control panel 130, and/or remote computing device 135, 145 described with reference to FIGS. 1-4, and/or aspects of one or more of the apparatus 205, 205-a, or 205-b described with reference to FIGS. 2-4. In some examples, a control panel, local computing device, and/or sensor unit may execute one or more sets of codes to control the functional elements described below. Additionally or alternatively, the control panel, local computing device, and/or sensor unit may perform one or more of the functions described below using special-purpose hardware.

At block 505, the method 500 may include receiving a call initiation instruction at a video monitoring component of a home automation system. In some examples, the call initiation instruction may be received as any of an auditory command, or a gestural command, or a user input, or a combination thereof. The call initiation instruction may be received at any component of the home automation system having a video monitoring component. For example, the call initiation instruction may be received at a sensor unit or a control panel. In some examples, a home occupant may press a button on the sensor unit or control panel (e.g., including each of the components differentiating between different actions related to the press of the button such as a quick press, a long press, a repeated press, a press and hold, etc.) to initiate instruction detection, while in other examples the home occupant may simply speak the command, or perform the gesture, or input the instruction associated with the call initiation instruction.

At block 510, the method 500 may include analyzing the call initiation instruction. As previously discussed with respect to FIGS. 2 and 3, analyzing the call initiation instruction may include identifying a portion of the call initiation instruction, the identified portion including any of a key word, or a key phrase, or a combination thereof, in the case of auditory commands, or including any of an image, or a video segment, or a gesture, or a combination thereof, in the case of gestural commands. Analyzing the call initiation instruction may also or alternatively include identifying the home occupant delivering the call initiation instruction. For example, at block 510, the audio associated with an auditory command may be analyzed with respect to a voice database in order to identify the home occupant who is speaking, or facial data detected by the video monitoring component may be analyzed with respect to a facial database in order to identify the home occupant who is giving a gestural or inputted command.

At block 515, the method 500 may include communicating a call request from the video monitoring component of the home automation system to a first remote user based at least in part on the received call initiation instruction. As previously discussed with respect to FIGS. 2 and 3, the call request may be communicated to the first user, via the video monitoring component of the home automation system, at any personal computing device or dedicated application associated with the first user, such as a smartphone, tablet, or personal computer. The call request may be communicated as a push notification, or as an email or SMS text message, or as a standard phone call, among other things. Upon receiving the call request, the first remote user may determine whether to accept or reject the call request, as discussed in more detail below with respect to FIGS. 6 and 7.

The operations at blocks 505, 510, and 515 may be performed using the receiver module 210, 210-a, the communication module 215, 215-a, 215-b, the transmitter module 220, 220-a, and/or the transceiver module 430, described with reference to FIGS. 2-4, among others.

Thus, the method 500 may provide for communication methods relating to automation/security systems. It should be noted that the method 500 is just one implementation and that the operations of the method 500 may be rearranged or otherwise modified such that other implementations are possible.

Figure 6:
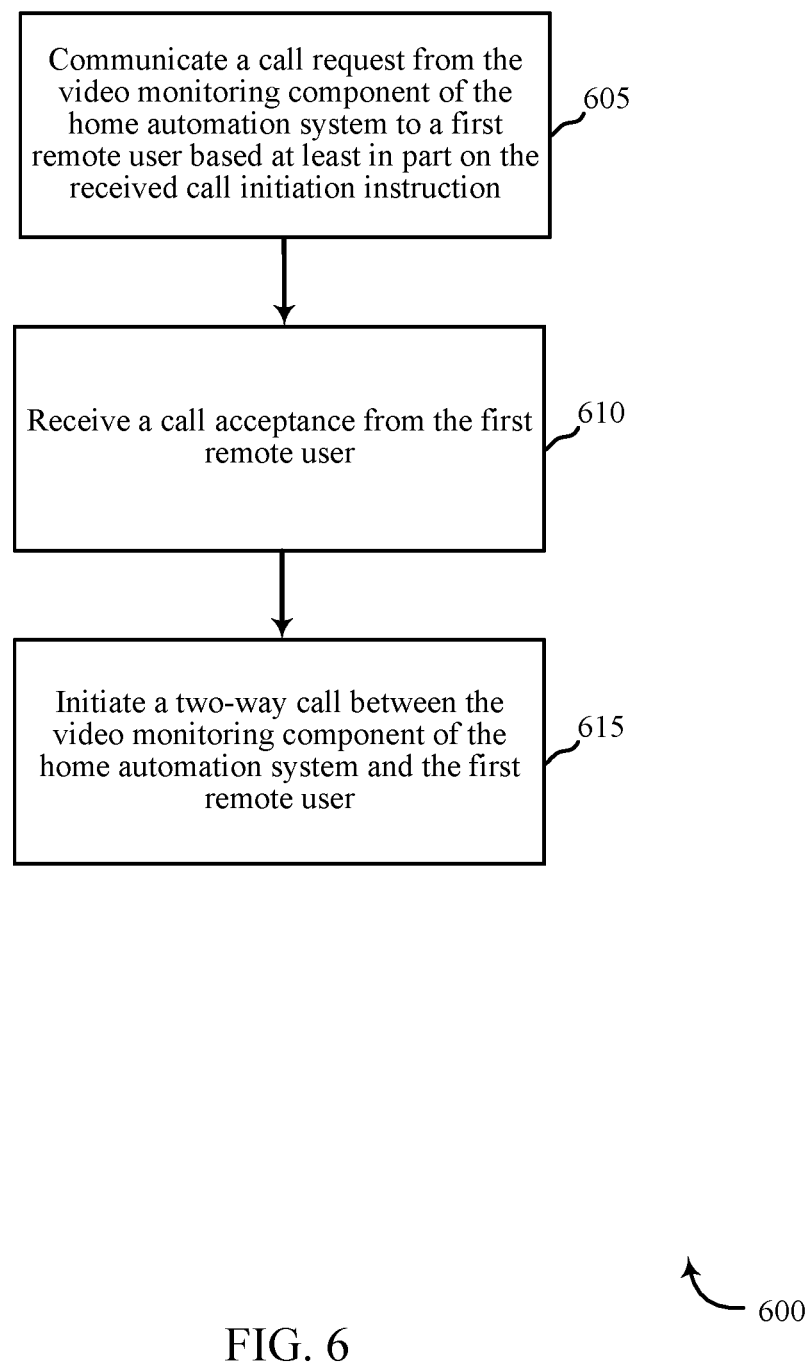
FIG. 6 is a flow chart illustrating an example of a method relating to a security and/or an automation system, in accordance with various aspects of this disclosure.

FIG. 6 is a flowchart illustrating an example of a method 600 for establishing a two-way call (among other contemplated variations) between a video monitoring component of a home automation system and a first remote user, in accordance with various aspects of the present disclosure. For clarity, the method 600 is described below with reference to aspects of one or more of the sensor units 110, local computing device 115, control panel 130, and/or remote computing device 135, 145 described with reference to FIGS. 1-4, and/or aspects of one or more of the apparatus 205, 205-a, or 205-b described with reference to FIGS. 2-4. In some examples, a control panel, local computing device, and/or sensor unit may execute one or more sets of codes to control the functional elements described below. Additionally or alternatively, the control panel, local computing device, and/or sensor unit may perform one or more of the functions described below using special-purpose hardware.

At block 605, method 600 may include communicating a call request from the video monitoring component of the home automation system to a first remote user based at least in part on the received call initiation instruction. Block 605 may therefore be an example of block 515 of method 500, as described with respect to FIG. 5, among others.

At block 610, the method 600 may include receiving a call acceptance from the first remote user. For example, the first remote user may receive a standard phone call at his smartphone, and may select "accept" or input some other command at his phone to accept the incoming call request. In other examples, the first remote user may receive a push notification through a dedicated application on his smartphone or tablet, and may input an acceptance at the application. In still other examples, the first remote user may receive a standard email or SMS text message, and may reply to the message with an acceptance. The acceptance from the first remote user may be communicated back to the home automation system.

At block 615, the method 600 may include initiating a two-way call between the video monitoring component of the home automation system and the first remote user. In some examples, the two-way call may be in the form of a two-way audio call, while in other examples the call may be a one-way video call, wherein only one of the home occupant or the first remote user may view the other, or in still other examples, the call may be a two-way video call. The two-way call may be facilitated by the home automation system, and may utilize a Wi-Fi signal, among other communication techniques.

Thus, the method 600 may provide for two-way communication methods relating to automation/security systems. It should be noted that the method 600 is just one implementation and that the operations of the method 600 may be rearranged or otherwise modified such that other implementations are possible.

Figure 7:
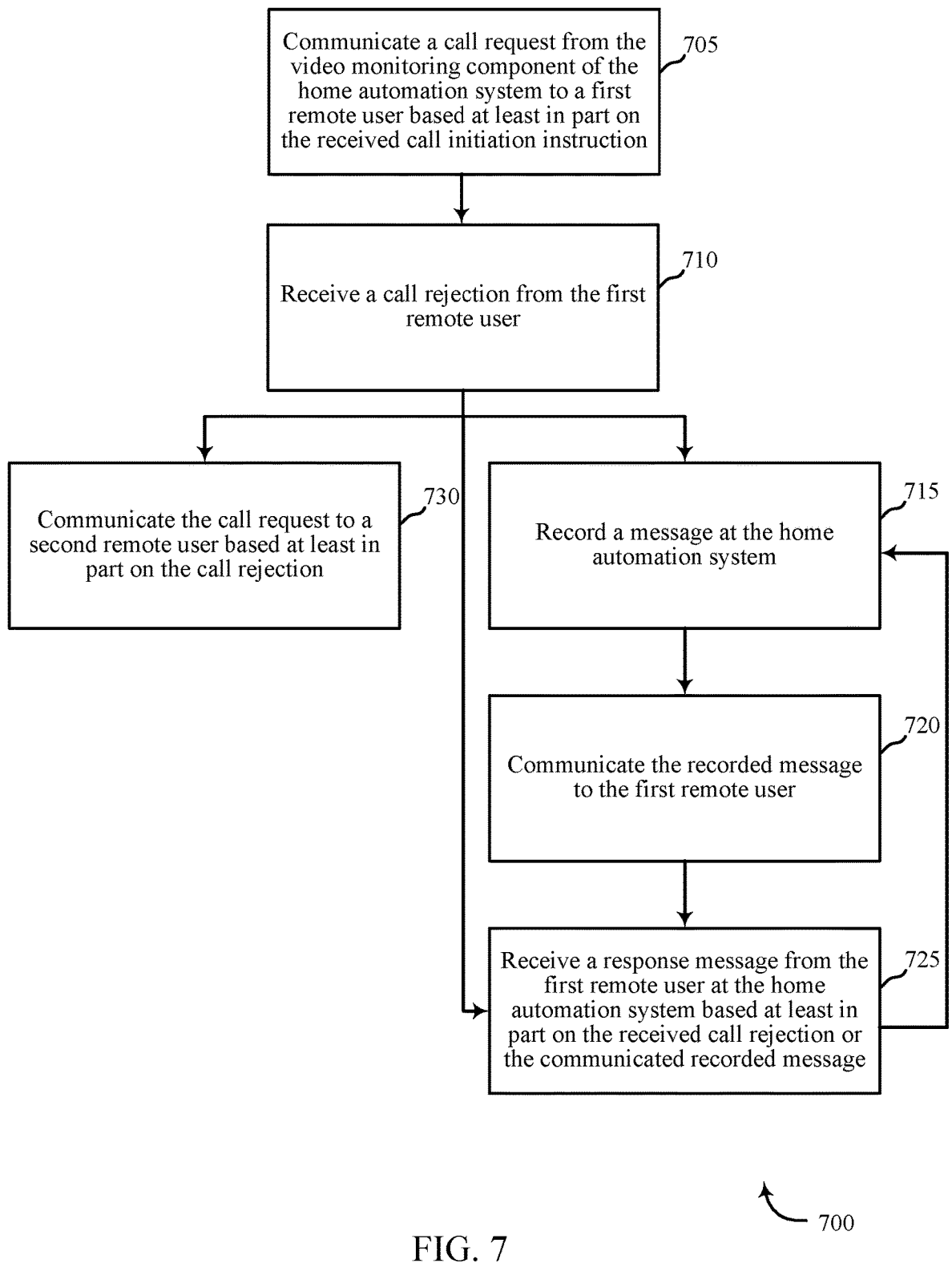
FIG. 7 is a flow chart illustrating an example of a method relating to a security and/or an automation system, in accordance with various aspects of this disclosure.

FIG. 7 is a flowchart illustrating an example of a method 700 for communicating recorded messages between a video monitoring component of a home automation system and a first remote user, in accordance with various aspects of the present disclosure. For clarity, the method 700 is described below with reference to aspects of one or more of the sensor units 110, local computing device 115, control panel 130, and/or remote computing device 135, 145 described with reference to FIGS. 1-4, and/or aspects of one or more of the apparatus 205, 205-*a*, or 205-*b* described with reference to FIGS. 2-4. In some examples, a control panel, local computing device, and/or sensor unit may execute one or more sets of codes to control the functional elements described below. Additionally or alternatively, the control panel, local computing device, and/or sensor unit may perform one or more of the functions described below using special-purpose hardware.

At block 705, the method 700 may include communicating a call request from the video monitoring component of the home automation system to a first remote user based at least in part on the received call initiation instruction. Thus, block 705 may be an example of block 515 of method 500, as described with respect to FIG. 5, and/or block 605 of method 600, as described with respect to FIG. 6.

At block 710, the method 700 may include receiving a call rejection from the first remote user. As discussed above with respect to FIG. 6, the first remote user may receive the call request at his personal computing device, for example in the form of an email, SMS text message, phone call, and/or push notification, and may elect whether to accept or reject the call request. In other examples, a failure to respond to the call request, for example because the first remote user is away from his phone and does not receive the request, may result in an automatic, passive call rejection, without the need for an active rejection by the first remote user. In some examples, the user initiating the call may be notified about whether the call was actively rejected and/or passively rejected and may initiate one or more additional actions based at least in part on one or more notifications. In this example, the first remote user has elected to reject the call request, either passively or actively. This call rejection may be communicated back to the home automation system.

In some examples, method 700 may continue from block 710 to block 715, at which the method 700 may include recording a message at the home automation system. For example, the home occupant may have inputted a call request at a video monitoring component of the home automation system, and may be notified at the video monitoring component, or at some other component of the home automation system, that the first remote user has rejected the home occupant's call request. As a result of this rejection, the home occupant may receive a prompt, for example in the form of a visual, auditory, and/or haptic alert or message, notifying the home occupant that his call request has been rejected, and giving him the option to record a message to be communicated to the first remote user. The home occupant may record this message, for example in the form of a text, audio, and/or video message, at a component of the home automation system.

At block 720, the method 700 may include communicating the recorded message to the first remote user. In some examples, as with the call request, the recorded message may be communicated to the first remote user, for example via Wi-Fi, as any of an email or text message, voice message, or push notification, or a combination thereof, at the first remote user's smartphone, tablet, or other personal computing device. The first remote user may view the recorded message immediately upon receipt, or may view the message at his convenience.

At block 725, the method 700 may include receiving a response message from the first remote user at the home automation system based at least in part on the received call rejection or the communicated recorded message. Thus, in some examples, the method 700 may proceed directly from block 710, at which the first remote user rejects the call request, to block 725, at which the first remote user records a response message to be communicated back to the home automation system. In other examples, the method 700 may proceed as described above, with the first remote user recording a message at block 725 in response to a recorded message received from the home occupant. The first remote user may record a response message at his personal computing device, for example in the form of an audio, video, and/or text message. The recorded response message may be communicated to the home occupant at any one or more component of the home automation system, and may be displayed and/or broadcasted for the home occupant. For example, the first remote user may record a video message through a dedicated application on his smartphone, and the recorded video message may be played automatically, or in response to a prompt from the home occupant, at a control panel for the home occupant to view. In some examples, the method 700 may cycle one or more times between blocks 725, 715, and 720, such that the home occupant and the first remote user may conduct an ongoing conversation in the form of text, audio, and/or video messages, without a two-way call ever being initiated.

In other examples, the method 700 may proceed from block 710, at which a call rejection is received from the first remote user, to block 730, at which the method 700 may include communicating the call request to a second remote user based at least in part on the call rejection. For example, a child home alone may have initially attempted to contact his mother by inputting a call request at a video monitoring component of the home automation system. The mother may have received but rejected the call request, for example because she is in a meeting, or may have missed the call request all together, because she was away from her phone or computer, resulting in a passive call request rejection. In response to this rejection, the home automation system may automatically relay the call request to a second remote user, such as the child's father, based, for example, at least in part on one or more inputted call preferences. These inputted call preferences may be specific to a calling user's preferences and/or profile, and/or may relate to one or more remote users' profiles and/or preferences, and/or system settings and/or defaults, among other things. In other examples, the home automation system may notify the child that the call request has been rejected, and he may manually input a second call request to his father or another remote user.

Thus, the method 700 may provide for various system responses to a call request rejection. It should be noted that the method 700 is just one implementation and that the operations of the method 700 may be rearranged or otherwise modified such that other implementations are possible.

Figure 8:
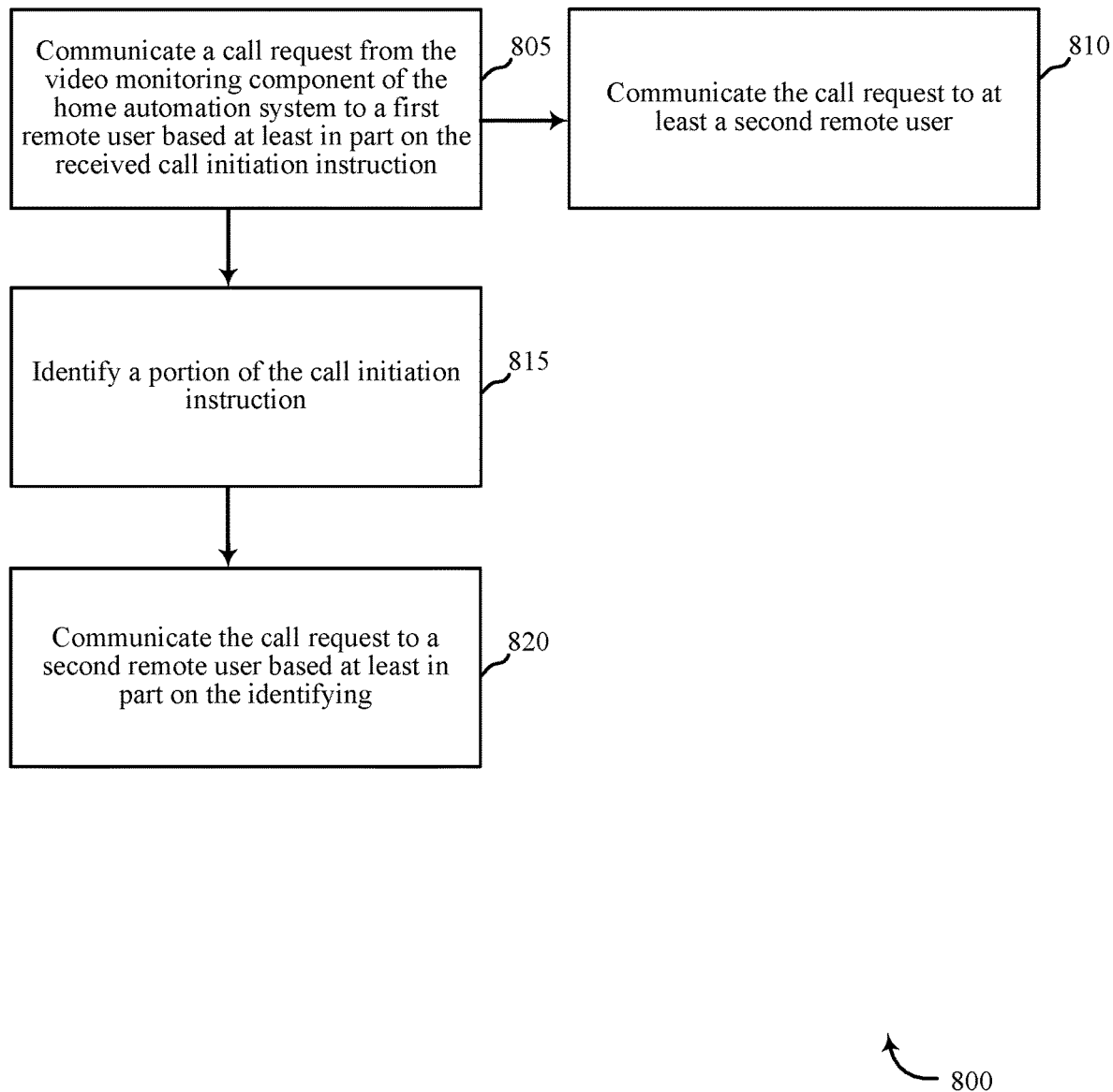
FIG. 8 is a flow chart illustrating an example of a method relating to a security and/or an automation system, in accordance with various aspects of this disclosure.

FIG. 8 is a flowchart illustrating an example of a method 800 for communicating call requests to one or more second remote users, in accordance with various aspects of the present disclosure. For clarity, the method 800 is described below with reference to aspects of one or more of the sensor units 110, local computing device 115, control panel 130, and/or remote computing device 135, 145 described with reference to FIGS. 1-4, and/or aspects of one or more of the apparatus 205, 205-a, or 205-b described with reference to FIGS. 2-4. In some examples, a control panel, local computing device, and/or sensor unit may execute one or more sets of codes to control the functional elements described below. Additionally or alternatively, the control panel, local computing device, and/or sensor unit may perform one or more of the functions described below using special-purpose hardware.

At block 805, the method 800 may include communicating a call request from the video monitoring component of the home automation system to a first remote user based at least in part on the received call initiation instruction. Thus, block 805 may be an example of any of block 515 of method 500, as described with respect to FIG. 5, or block 605 of method 600, as described with respect to FIG. 6.

At block 810, the method 800 may include communicating the call request to at least a second remote user. In some embodiments, the method 800 at blocks 805 and 810 may occur partially or fully simultaneously, while in other examples, the method 800 at blocks 805 and 810 may occur sequentially. For example, a home occupant may wish to contact any remote user associated with the home automation system, without specificity. Accordingly, at block 810, the call request may be communicated to all remote users associated with the home automation system. In some examples, the method 800 at block 810 may occur in series, such that each remote user associated with the home automation system receives a call request in series until one of the remote users accepts the call request, after which no further requests will be sent. In other examples, all of the remote users may receive call requests at the same time or nearly the same time, and one or more than one remote users may accept the call request such that a two-way call between the home occupant and one or more remote users may be established.

In other examples, the method 800 may proceed from block 805 to block 815, which may include identifying a portion of the call initiation instruction. For example, as discussed above with respect to FIG. 3, an instruction analyzing module may analyze the received call request for key words, phrases, gestures, images, video segments, or the like, to determine one or more second remote users to whom to communicate the call request. In this way, the home automation system may deduce one or more second remote users with whom the home occupant may wish to initiate a two-way call, for example in the event that the first remote user rejects the call request, or in other examples in order to initiate a group call.

In other examples, the method 800 may proceed from block 815 to block 820, which may include communicating the call request to a second remote user based at least in part on the identifying. For example, as discussed above with respect to FIG. 3, after one or more portions of the call initiation instruction have been identified and/or analyzed, one or more components may communicate the call request to a second remote user based at least in part on the identifying and/or the analyzing. In this way, based at least in part on the home automation system deducing one or more second remote users with whom the home occupant may wish communicate, one or more components may transmit and/or otherwise communicate information, such as a call request, to a second remote user.

Figure 9:
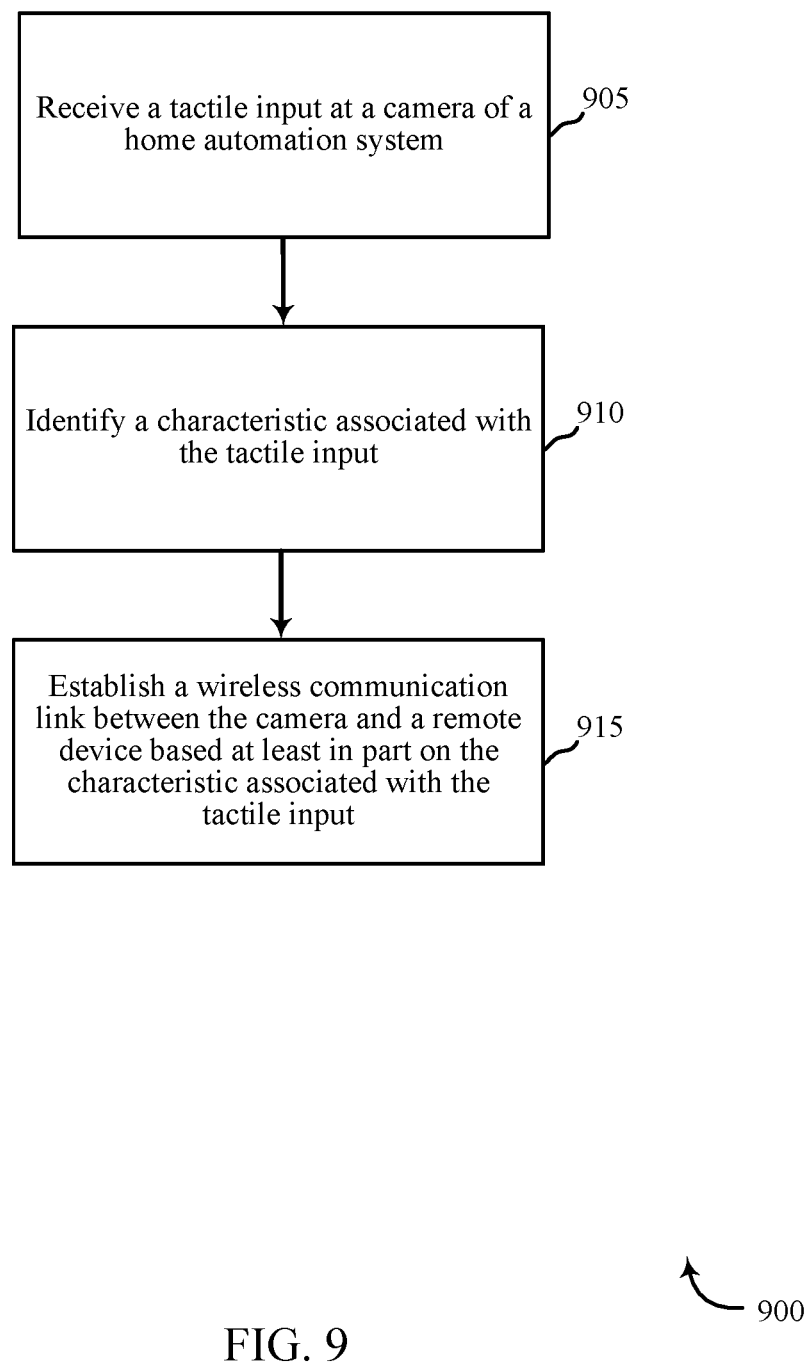
FIG. 9 is a flow chart illustrating an example of a method relating to a security and/or an automation system, in accordance with various aspects of this disclosure.

FIG. 9 is a flowchart illustrating an example of a method 900 for establishing a wireless communication link between a camera and another device, in accordance with various aspects of the present disclosure. For clarity, the method 900 is described below with reference to aspects of one or more of the sensor units 110, local computing device 115, control panel 130, the camera, and/or remote computing device 135, 145 described with reference to FIGS. 1-4, and/or aspects of one or more of the apparatus 205, 205-a, or 205-b described with reference to FIGS. 2-4. In some examples, a control panel, a camera, a local computing device, and/or sensor unit may execute one or more sets of codes to control the functional elements described below. Additionally or alternatively, the control panel, local computing device, and/or sensor unit may perform one or more of the functions described below using special-purpose hardware.

At block 905, the method 900 may include receiving a tactile input at a camera of a home automation system. In some embodiments, the camera may receive the tactile input that may indicate a request to establish a call between the camera and the local computing device 115 and/or the remote computing device 135,145. In some embodiments, the camera may receive a call initiation instruction for initiating a call with a remote user associated with the home automation system. For example, a user may provide an input, such as pushing a button and a general call may be placed to any member of the family or other remote user associated with the home automation system. In some embodiments, the camera may include, but is not limited to, one or more buttons. A user may press and/or depress a button that may be indicative that the user wishes to initiate a call between the camera and another device (e.g., remote computing device 135, 145 and/or local computing device 115). For instance, a child at home may want to call his mother, the child may perform a single actuation of a single button on the camera that may initiate a call to a device associated with the mother. The operation at block 905 may be performed using the receiver module 210, computing device 135, control panel 130, camera, sensors 110, or apparatus 205, described with reference to FIGS. 2-7.

At block 910, the method 900 may include identifying a characteristic associated with the tactile input. For example, where the home occupant has provided a call initiation instruction as a gestural command, instruction analyzing module 305 may compare the detected gestures with a database of known gestures, such as hand signals or the like, and corresponding call one or more requested recipients. The operation at block 910 may be performed using the receiver module 210, computing device 135, control panel 130, camera, sensors 110, instruction analyzing module 305, or apparatus 205, described with reference to FIGS. 2-7.

At block 915, the method 900 may include establishing a wireless communication link between the camera and a remote device based at least in part on the characteristic associated with the tactile input. For example, as discussed above with respect to FIG. 3, an instruction analyzing module may analyze the received call request for key words, phrases, gestures, images, video segments, or the like, to determine one or more users with which to communicate the call request. The operation at block 915 may be performed using the transmitter module 220, computing device 135, control panel 130, camera, call request module 310, call initiation module 315, or apparatus 205, described with reference to FIGS. 2-7.

Figure 10:
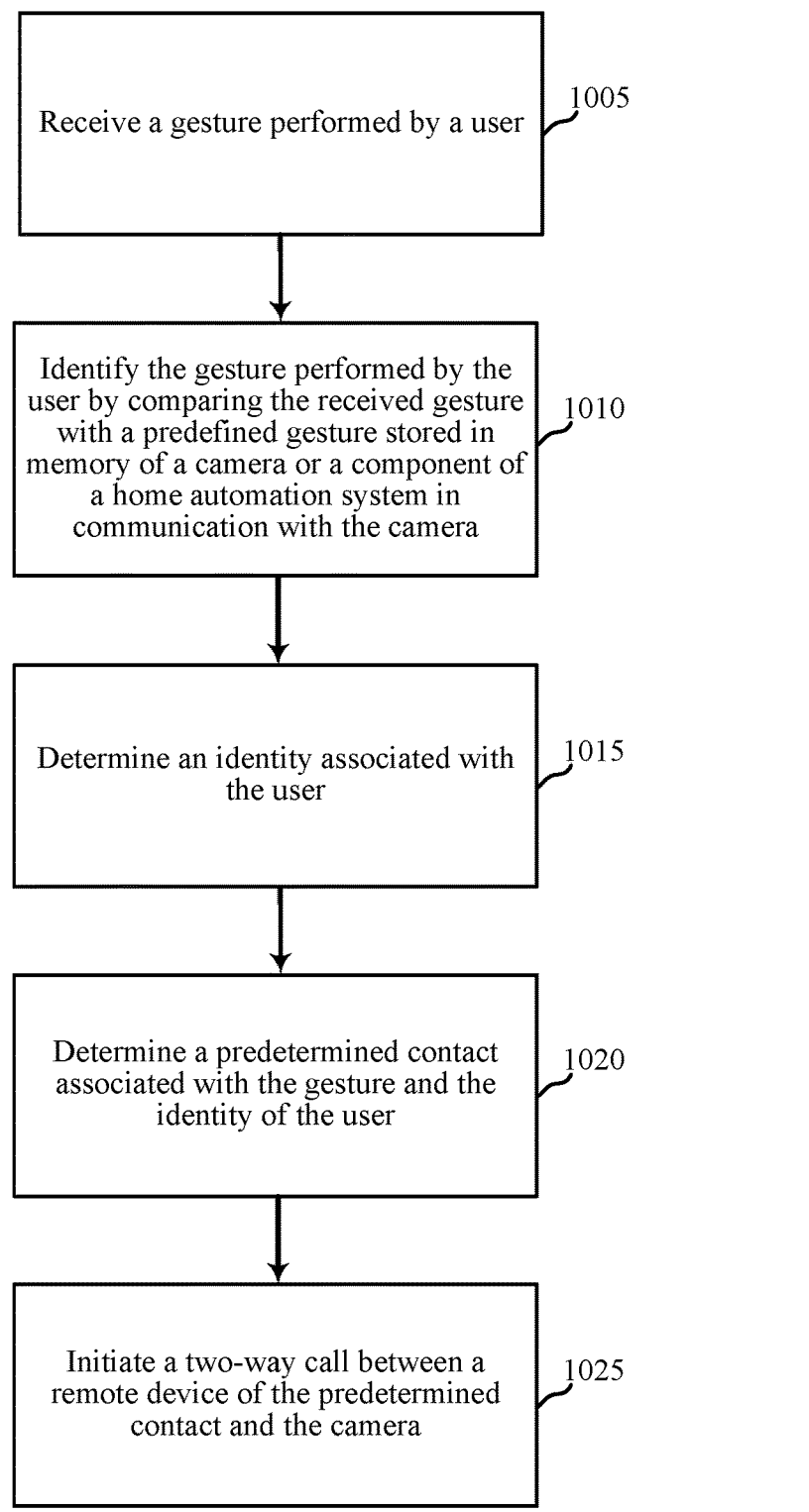
FIG. 10 is a flow chart illustrating an example of a method relating to a security and/or an automation system, in accordance with various aspects of this disclosure.

FIG. 10 is a flowchart illustrating an example of a method 1000 for initiating a call between a camera and another device, in accordance with various aspects of the present disclosure. For clarity, the method 1000 is described below with reference to aspects of one or more of the sensor units 110, local computing device 115, control panel 130, the camera, and/or remote computing device 135, 145 described with reference to FIGS. 1-4, and/or aspects of one or more of the apparatus 205, 205-*a*, or 205-*b* described with reference to FIGS. 2-4. In some examples, a control panel, a camera, a local computing device, and/or sensor unit may execute one or more sets of codes to control the functional elements described below. Additionally or alternatively, the control panel, local computing device, and/or sensor unit may perform one or more of the functions described below using special-purpose hardware.

At block 1005, the method 1000 may include receiving a gesture performed by a user. In one embodiment, a gesture may include, but is not limited to, a tactile input. In some embodiments, a tactile input may include, but is not limited to, a tap, a double tap, a drag, a flick, a rotate, a spread, or a pinch, among others. In other embodiments, a gesture may include, but is not limited to, an interactive motion performed by the user, for example, a hand gesture (e.g., waving, hand signal, etc.) In some cases, the gesture may be associated with a duration. For instance, a child may initiate call to his parent based on performing a tactile input for a predetermined duration (e.g., 1 second) at the camera. In some examples, a child may initiate a call to his mother based on performing a tactile input for a first predetermined duration (e.g., 1 second), while initiating a call to his father based on performing a tactile input for a second predetermined duration (e.g., 3 seconds). In other embodiments, a child may initiate a call to his parent(s) based on a frequency (i.e., number of times) of a received gesture. For example, a child may initiate call to his parent or parents based on performing a gesture (e.g., actuating a button on the camera one or more times) a number of times at the camera. In some embodiments, the frequency of the received gesture may be correlated by one or more component of the home automation system to identify a predetermined contact or contacts associated with the gesture and the frequency of the gesture, as described elsewhere herein. For example, a child actuating a button on the camera once may indicate a request to initiate a call to the child's mother, while actuating the button twice may indicate a request to call the child's father. The operation at block 1005 may be performed using the receiver module 210, computing device 135, control panel 130, camera, sensors 110, or apparatus 205, described with reference to FIGS. 2-7.

At block 1010, the method 1000 may include identifying the gesture performed by the user by comparing the received gesture with a predefined gesture stored in memory of the camera or a component of a home automation system in communication with the camera. For example, where the home occupant has provided a call initiation instruction as a gestural command, instruction analyzing module 305 may compare the detected gestures with a database of known gestures, such as hand signals or the like, and corresponding call request recipients. In some embodiments, the instruction analyzing module 305 may analyze audio input, video input, or some combination thereof. In one embodiment, the instruction analyzing module 305 may compare the received audio input, video input, or some combination thereof with stored profile information. The stored profile information may be, but is not limited to, a particular user associated with the home automation system. In other examples, where the home occupant has provided a verbal command, instruction analyzing module 305 may compare the detected command with a database of command keywords or phrases and corresponding call request recipients. In other examples, where the home occupant has provided a verbal command, instruction analyzing module 305 may compare the detected audio with a database of known user profiles (e.g., including voice inflection, tone, vocabulary, pronunciation, and/or some combination, among others), database of command keywords or phrases, corresponding call request recipients or some combination thereof, among other things. The operation at block 1010 may be performed using the receiver module 210, computing device 135, control panel 130, camera, sensors 110, or apparatus 205, described with reference to FIGS. 2-7.

At block 1015, the method 1000 may include determining an identity associated with the user. In one embodiment, the instruction analyzing module 305 may analyze the gesture to determine an identity of the home occupant issuing the command. For example, instruction analyzing module 305 may receive facial data and/or body data (e.g., height, weight, shape, eye color, hair color, face shape) associated with the home occupant from one or more sensor units and may compare that data with a database of known home occupant identities to identify the occupant. In another example, instruction analyzing module 305 may conduct voice analysis by comparing audio detected by one or more sensor units with a database of vocal identification data to determine the identity of a home occupant speaking a verbal call initiation command. The operation at block 1015 may be performed using the transmitter module 220, computing device 135, control panel 130, camera, the instruction analyzing module 305, or apparatus 205, described with reference to FIGS. 2-7.

At block 1020, the method 1000 may include determining a predefined contact associated with the gesture and the identity of the user. In some examples, analysis of the gesture and determining the identity of the user may lead to the instruction analyzing module 305 to determine a predefined contact. For example, a child may have inputted a call request as a gestural command at a video monitoring component of a control panel and/or a camera (apparatus 205-*a*). Instruction analyzing module 305 may analyze the gestural command and/or one or more characteristics (e.g., voice characteristics, physical characteristics) the identity of the requesting child, and may derive an instruction to transmit a call request to the child's father as opposed to a grandmother, a neighbor, or another contact. In some embodiments, the method may include determining a predefined contact associated with one or more tactile inputs and the identity of the user. The operation at block 1025 may be performed using the transmitter module 220, computing device 135, control panel 130, camera, instruction analyzing module 305, or apparatus 205, described with reference to FIGS. 2-7

At block 1025, the method 1000 may include initiating a two-way call between a remote device of the predetermined contact and the camera. The operation at block 1025 may be performed using the transmitter module 220, computing device 135, control panel 130, camera, call request module 310, call initiation module 315, or apparatus 205, described with reference to FIGS. 2-7.

For clarity, the method 1000 is described below with reference to aspects of one or more of the sensor units 110, local computing device 115, control panel 130, the camera, and/or remote computing device 135, 145 described with reference to FIGS. 1-4, and/or aspects of one or more of the apparatus 205, 205-*a*, or 205-*b* described with reference to FIGS. 2-4. In some examples, a control panel, a camera, a local computing device, and/or sensor unit may execute one or more sets of codes to control the functional elements described below. Additionally or alternatively, the control panel, local computing device, and/or sensor unit may perform one or more of the functions described below using special-purpose hardware.

In some examples, aspects from two or more of the methods 500, 600, 700, 800, 900, 1000 may be combined and/or separated. It should be noted that the methods 500, 600, 700, 800, 900, 1000 are just example implementations, and that the operations of the methods 500-1000 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for wireless communication, comprising:
   receiving a tactile input at a stand-alone camera of a home automation system;
   identifying, via the stand-alone camera, a characteristic associated with the tactile input;
   determining, based at least in part on the tactile input, that a gesture is in queue;
   detecting the gesture performed by a person in line-of-sight of the stand-alone camera;
   analyzing the gesture based at least in part on determining the gesture is in queue;
   identifying, based at least in part on the identified characteristic, the analyzed gesture, or a combination thereof, a contact from a contact database; and
   establishing a wireless communication link between the stand-alone camera and a remote device associated with the identified contact.

2. The method of claim 1, wherein the tactile input comprises:
   an indication that the person intends to initiate a call with a remote device, and wherein identifying the contact further comprises identifying a contact from a set of contacts in the contact database based on the gesture.

3. The method of claim 1, wherein identifying the characteristic comprises:
   determining that the tactile input has been received a predetermined number of times, has been received during a predetermined duration, or a combination thereof.

4. The method of claim 1, wherein identifying the characteristic comprises:
   comparing the tactile input with a predefined tactile input sequence during a time period; and
   identifying the characteristic based at least in part on the comparing.

5. The method of claim 4, wherein the predefined tactile input sequence is user-defined, system-defined, is associated with a user profile, or a combination thereof.

6. The method of claim 1, further comprising:
   identifying a preconfigured user behavior corresponding to the person;
   determining that the tactile input, the gesture, or both, deviate from the preconfigured user behavior; and
   determining, based at least in part on the determined deviation, that a communication from the person is urgent, wherein establishing the wireless communication link between the stand-alone camera and the remote device is based at least in part on the determining that the communication is urgent.

7. The method of claim 6, wherein establishing the wireless communication link further comprises:
   initiating the wireless communication link immediately upon determining that the communication from the person is urgent.

8. The method of claim 6, wherein identifying the contact from the contact database further comprises:
   identifying an emergency contact, based at least in part on determining that the communication form the person is urgent.

9. The method of claim 1, wherein the tactile input and the gesture are performed by the person simultaneously.

10. The method of claim 1, wherein the tactile input is performed by the person prior to the gesture.

11. The method of claim 1, wherein the gesture is performed by the person prior to the tactile input.

12. The method of claim 1, further comprising:
    identifying a set of predetermined contacts in the contact database, each predetermined contact of the contact database having a unique correlation with a characteristic of a respective tactile input, wherein the identified contact is one of the set of predetermined contacts having a respective unique correlation with the identified characteristic of the tactile input.

13. The method of claim 1, further comprising:
comparing the gesture with a database of gestures, each gesture in the database of gestures having a unique correlation with a contact in the contact database, wherein the identified contact is one of the contacts in the contact database having a unique correlation with a gesture in the database of gestures.

14. The method of claim 1, wherein the gesture comprises a hand gesture.

15. The method of claim 1, wherein the gesture comprises an interactive physical motion captured as a still image, a video, or a combination thereof.

16. The method of claim 1, wherein the tactile input comprises a tap, a double tap, a drag, a flick, a rotation, a spreading motion, a pinching motion, or a combination thereof.

17. The method of claim 1, further comprising:
determining, via the stand-alone camera, an identify of the person perform the tactile input based at least in part on the gesture, detected user information, or a combination thereof.

18. A stand-alone camera for wireless communication, comprising:
a processor;
memory in electronic communication with the processor; and
instructions stored in the memory, the instructions being executable by the processor to:
receive a tactile input at a stand-alone camera of a home automation system;
identify, via the stand-alone camera, a characteristic associated with the tactile input;
determine, based at least in part on the tactile input, that a gesture is in queue;
detect the gesture performed by a person in line-of-sight of the stand-alone camera;
analyze the gesture based at least in part on determining the gesture is in queue;
identify, based at least in part on the identified characteristic, the analyzed gesture, or a combination thereof, a contact from a contact database; and
establish a wireless communication link between the stand-alone camera and a remote device associated with the identified contact.

19. The method of claim 18, wherein the tactile input comprises:
an indication that the person intends to initiate a call with a remote device, and wherein identifying the contact further comprises identifying a contact from a set of contacts in the contact database based on the gesture.

20. A non-transitory computer-readable medium storing computer-executable code, the code executable by a processor to:
receive a tactile input at a stand-alone camera of a home automation system;
identify, via the stand-alone camera, a characteristic associated with the tactile input;
determine, based at least in part on the tactile input, that a gesture is in queue;
detect the gesture performed by a person in line-of-sight of the stand-alone camera;
analyzing the gesture based at least in part on determining the gesture is in queue;
identify, based at least in part on the identified characteristic, the analyzed gesture, or a combination thereof, a contact from a contact database; and
establish a wireless communication link between the stand-alone camera and a remote device associated with the identified contact.

* * * * *